United States Patent
Kogure

(10) Patent No.: US 11,661,105 B2
(45) Date of Patent: May 30, 2023

(54) STEERING DEVICE

(71) Applicant: SHOWA CORPORATION, Gyoda (JP)

(72) Inventor: Akihiro Kogure, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 323 days.

(21) Appl. No.: 16/895,358

(22) Filed: Jun. 8, 2020

(65) Prior Publication Data

US 2020/0298909 A1 Sep. 24, 2020

Related U.S. Application Data

(63) Continuation-in-part of application No. PCT/JP2018/001592, filed on Jan. 19, 2018.

(51) Int. Cl.
 *B62D 6/00* (2006.01)
 *B62D 5/04* (2006.01)
 (Continued)

(52) U.S. Cl.
 CPC .............. *B62D 6/002* (2013.01); *B62D 5/046* (2013.01); *B62D 5/0421* (2013.01); *B62D 3/12* (2013.01);
 (Continued)

(58) Field of Classification Search
 CPC ...... B62D 6/002; B62D 5/0421; B62D 5/046; B62D 3/12; B62D 5/006; B62D 5/0454; B62D 6/008; B62D 6/04; Y02T 90/14
 (Continued)

(56) References Cited

U.S. PATENT DOCUMENTS 6,168,691 B1 1/2001 Kauper et al.
2012/0010042 A1* 1/2012 Ha .................. F16H 61/0213
477/15

FOREIGN PATENT DOCUMENTS

JP 10-315987 A 12/1998
JP 2005-263182 A 9/2005
(Continued)

OTHER PUBLICATIONS

International Search Report dated Mar. 6, 2018 for the corresponding PCT International Patent Application No. PCT/JP2018/001592.

*Primary Examiner* — Scott A Reinbold
(74) *Attorney, Agent, or Firm* — Leason Ellis LLP; Edward J. Ellis; Melvin C. Garner

(57) ABSTRACT

A steering device includes: an electric motor configured to apply a driving force to cause a wheel of a vehicle to roll; a transmission unit configured to transmit the driving force of the electric motor to the wheel; an input determination unit 221 configured to determine whether an excessive external force equal to or greater than a predetermined force is input, or likely to be input, to the transmission unit via the wheel while the electric motor is applying the driving force; and a final target current setting unit 23 configured to, in response to the input determination unit 221 determining that the excessive force is input, or likely to be input, to the transmission unit, reduce the driving force of the electric motor so that a load on the transmission unit does not exceed an upper limit that is preset according to strength of the transmission unit.

12 Claims, 14 Drawing Sheets

(51) Int. Cl.
  *B62D 3/12* (2006.01)
  *B62D 5/00* (2006.01)
(52) U.S. Cl.
  CPC ............ *B62D 5/006* (2013.01); *B62D 5/0454* (2013.01); *B62D 6/008* (2013.01)
(58) Field of Classification Search
  USPC .......................................................... 701/41
  See application file for complete search history.

(56)  References Cited

FOREIGN PATENT DOCUMENTS

JP  2007-230471 A  9/2007
JP  2015-000617 A  1/2015

\* cited by examiner

STEERING DEVICE

CROSS-REFERENCE TO RELATED APPLICATIONS

This application is a continuation-in-part of PCT application No. PCT/JP2018/001592 filed on Jan. 19, 2018, the content of which is incorporated herein by reference.

FIELD OF THE INVENTION

The present invention relates to a steering device.

BACKGROUND OF THE INVENTION

A steering device using a steer-by-wire system has been proposed. In the steer-by-wire system, a steering wheel and wheels are not mechanically connected but mechanically separated.

A vehicle control device disclosed in Japanese Patent Application Laid-Open Publication No. 2005-263182 includes: an intention detection unit configured to detect a driver's intention; a plurality of by-wire systems configured to electrically operate an actuator in response to an output from the intention detection unit; an abnormality detection unit configured to detect abnormality in each of the plurality of by-wire systems; and a complement unit configured to complement operation of the by-wire system in which abnormality has been detected by the abnormality detection unit by operation of another by-wire system.

Technical Problem

In a system in which wheels and a steering wheel are mechanically connected, an external force on the wheels to change their rolling angles is eventually transmitted to the steering wheel, whereas in the steer-by-wire system, such force is eventually transmitted to the electric motor. For this reason, in the steer-by-wire system, it is difficult to relieve a force that is due to the external force on the wheels and acts on a transmission unit transmitting the driving force of the electric motor to the wheels. Thus, it is required to prevent an excessive load from acting on the transmission unit due to an external force being applied. While this may be done by increasing strength of components constituting the transmission unit, such increase in strength requires increasing the size of the components or using high strength materials for them. Meanwhile, the steering device has been desired to be compact and light. In terms of making the steering device compact, it is not preferable to increase the size of the components. In terms of making the steering device light, it is preferable to use resin or other materials having less strength than metals, rather than using metals.

An object of the present invention is to provide a steering device that is made compact and light and can reduce load on the transmission unit due to an external force.

SUMMARY OF THE INVENTION

Solution to Problem

With the above object in view, an aspect of the present invention relates to a steering device including: an electric motor configured to apply a driving force to cause a wheel of a vehicle to roll; a transmission unit configured to transmit the driving force of the electric motor to the wheel; an input determination unit configured to determine whether an excessive external force equal to or greater than a predetermined force is input, or likely to be input, to the transmission unit via the wheel while the electric motor is applying the driving force; and a reduction unit configured to, in response to the input determination unit determining that the excessive force is input, or likely to be input, to the transmission unit, reduce the driving force of the electric motor so that a load on the transmission unit does not exceed an upper limit that is preset according to strength of the transmission unit.

Advantageous Effects of Invention

According to the present invention, it is possible to make the steering device compact and light and also to reduce load on the transmission unit due to an external force.

DETAILED DESCRIPTION OF THE INVENTION

Embodiments of the present invention will be described in detail below with reference to the attached drawings.

First Embodiment

Figure 1:
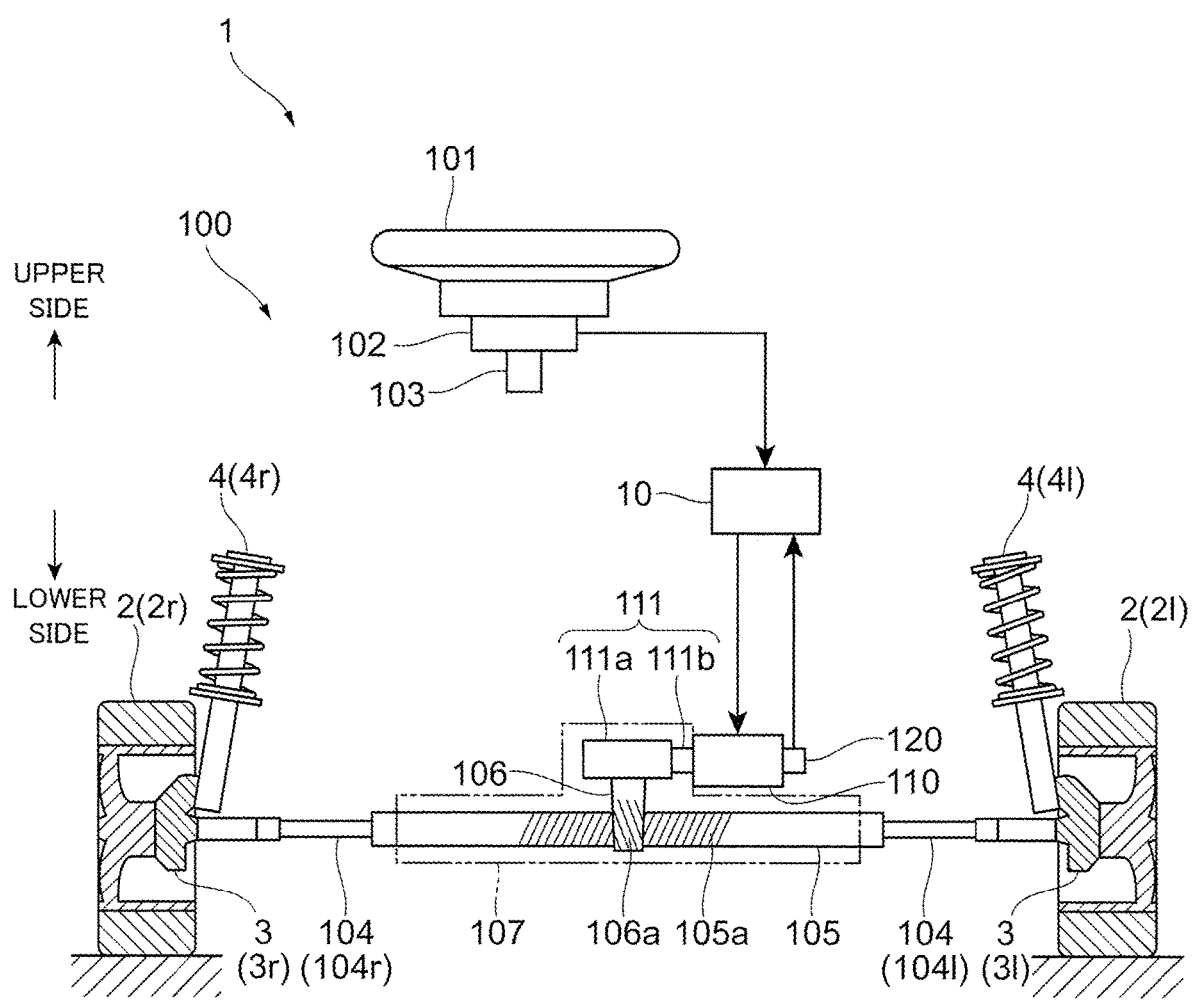
FIG. 1 shows a schematic configuration of an automobile of the first embodiment.

FIG. 1 shows a schematic configuration of an automobile 1 of the first embodiment. FIG. 1 shows the automobile 1 when viewed from the front.

The automobile 1 includes front wheels 2 as an example of the wheel and knuckle arms 3 fixed to the respective front wheels 2. The automobile 1 further includes suspension devices 4 whose one ends are connected to a vehicle body (not shown) and whose other ends are coupled with the respective knuckle arms 3. The suspension devices 4 absorb shocks and vibrations from road surfaces. The front wheels 2, the knuckle arms 3, and the suspension devices 4 are provided on left and right sides of the automobile 1. Hereinafter, the front wheel 2, the knuckle arm 3, and the suspension device 4 provided on the left side of the automobile 1 (the right side in FIG. 1) may be referred to as a left front wheel 2l, a left knuckle arm 3l, and a left suspension device 4l, respectively. Also, the front wheel 2, the knuckle arm 3, and the suspension device 4 provided on the right side of the automobile 1 (the left side in FIG. 1) may be referred to as a right front wheel 2r, a right knuckle arm 3r, and a right suspension device 4r, respectively.

The automobile 1 further includes a steering device 100 to change a traveling direction of the automobile 1 to any direction by rolling the front wheels 2.

The steering device 100 includes a wheel-like steering wheel (handle) 101 operated by a driver to change a traveling direction of the automobile 1, and a steering angle sensor 102 that detects a steering angle θs of the steering wheel 101. The steering device 100 further includes a reaction force device 103 that gives a steering reaction force to the driver.

The steering device 100 further includes tie rods 104 coupled with the respective knuckle arms 3, and a rack shaft 105 coupled with the tie rods 104. The knuckle arms 3 and the tie rods 104, and the tie rods 104 and the rack shaft 105 are coupled by a ball joint coupling. Hereinafter, the tie rod 104 provided on the left side (the right side in FIG. 1) of the automobile 1 may be referred to as a left tie rod 104l, and the tie rod 104 provided on the right side (the left side in FIG. 1) of the automobile 1 may be referred to as a right tie rod 104r.

The steering device 100 further includes a pinion 106a that constitutes a rack and pinion mechanism together with rack teeth 105a formed on the rack shaft 105. The pinion 106a is formed at a lower end of the pinion shaft 106. The pinion shaft 106 applies by rotation a driving force (rack shaft force) to the rack shaft 105 by which the front wheels 2 are rolled.

The steering device 100 further includes a steering gearbox 107 containing the pinion shaft 106. The steering device 100 further includes an electric motor 110 supported by the steering gearbox 107, and a deceleration mechanism 111 that decelerates rotation of the electric motor 110 before transmitting it to the pinion shaft 106.

The electric motor 110 applies a rotary force to the pinion shaft 106, thereby applying a driving force (rack axial force) to the rack shaft 105, which in turn causes the front wheels 2 to roll. The electric motor 110 of the present embodiment is a three-phase brushless motor including a resolver 120 that outputs a rotation angle signal θms depending on a motor rotation angle θm, which is a rotation angle of the electric motor 110.

The deceleration mechanism 111 includes a worm wheel 111a fixed to the pinion shaft 106, and a worm 111b coupled with an output shaft of the electric motor 110 via a shaft coupling (not shown).

The steering device 100 further includes a controller 10 to control operation of the electric motor 110. The controller 10 receives output signals from the aforementioned steering angle sensor 102, the resolver 120 and the like.

The above-configured steering device 100 controls driving of the electric motor 110 on the basis of the steering angle θs detected by the steering angle sensor 102. The driving force (generated torque) of the electric motor 110 is transmitted to the knuckle arms 3 through the deceleration mechanism 111, the pinion shaft 106, the rack shaft 105, and the tie rods 104. The knuckle arms 3 applied with the force cause the front wheels 2 to roll, whereby the traveling direction of the automobile 1 is changed. The deceleration mechanism 111, the pinion shaft 106, the rack shaft 105, and the tie rods 104 are components (elements) that constitute a transmission unit to transmit the driving force of the electric motor 110 to the front wheels 2.

The automobile 1 of the present embodiment is configured such that when the rack shaft 105 moves from a neutral position (position where the front wheels 2 are at a zero degree rolling angle) to the right during the automobile 1 moving forward, the front wheels 2 roll (turn) to the left. On the other hand, when the rack shaft 105 moves from the neutral position to the left, the front wheels 2 roll (turn) to the right.

(Controller)

An explanation will be given of the controller 10.

Figure 2:
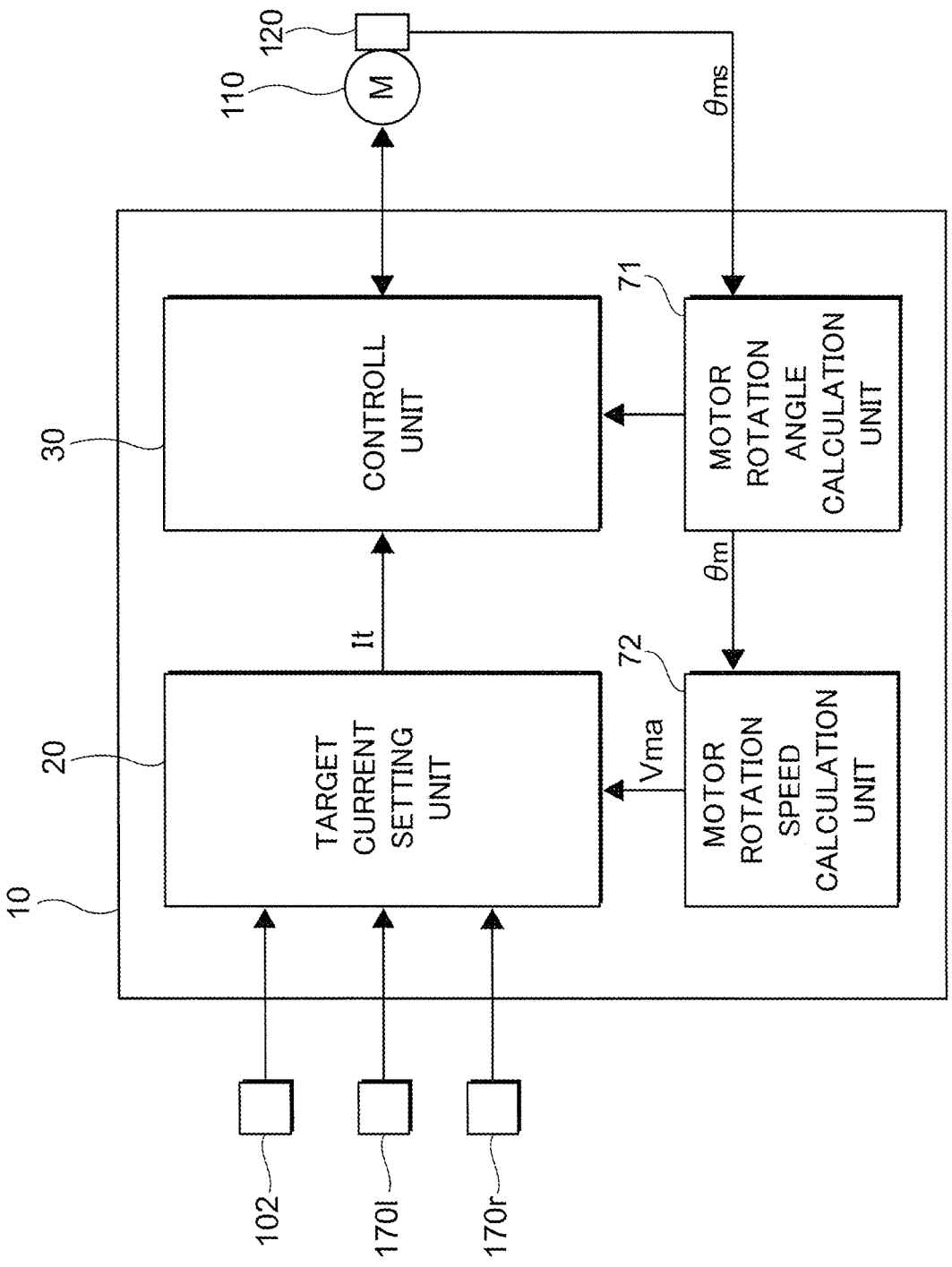
FIG. 2 shows a schematic configuration of a controller.

FIG. 2 shows a schematic configuration of the controller 10.

The controller 10 is an arithmetic logical unit consisting of a CPU, a ROM, a RAM, a backup RAM etc.

The controller 10 receives input of signals from the steering angle sensor 102 and the resolver 120 described above. Via a network (CAN) for communication of signals to control various apparatuses installed on the automobile 1, the controller 10 also receives input of signals from a left stroke sensor 170l and a right stroke sensor 170r detecting an expansion/contraction amount of the left suspension device 4l and the right suspension device 4r, respectively.

The controller 10 includes a target current setting unit 20 that sets a target current It to be supplied to the electric motor 110. The controller 10 also includes a control unit 30 that performs various control including a feedback control on the basis of the target current It set by the target current setting unit 20. The controller 10 also includes a motor rotation angle calculation unit 71 that calculates the motor rotation angle θm of the electric motor 110. The controller 10 also includes a motor rotation speed calculation unit 72 that calculates an actual rotation speed Vma, which is a rotation speed of the electric motor 110, on the basis of the motor rotation angle θm calculated by the motor rotation angle calculation unit 71.

The target current setting unit 20 will be described later.

[Control Unit]

The control unit 30 includes: a motor drive control unit (not shown) to control operation of the electric motor 110; a motor driving unit (not shown) to drive the electric motor 110; and a motor current detection unit (not shown) to detect an actual current Im actually flowing to the electric motor 110.

The motor drive control unit includes a feedback (F/B) controller (not shown) that performs feedback control on the basis of deviation between the target current It finally determined by the target current setting unit 20 and the actual current Im to the electric motor 110 detected by the motor current detection unit. The motor drive control unit further includes a PWM signal generator (not shown) that generates a pulse width modulation (PWM) signal to PWM-drive the electric motor 110.

The motor driving unit is a so-called inverter, and includes for example six independent transistors (FETs) as switching elements. Out of the six transistors, three transistors are connected between a positive electrode line of a power source and an electric coil of each phase, and the other three transistors are connected between a negative electrode (earth) line and the electric coil of each phase. Gates of two transistors selected from the six transistors are driven to enable switching operation of the two transistors, whereby driving of the electric motor 110 is controlled.

For example, the motor current detection unit detects a value of the actual current Im flowing to the electric motor 110, on the basis of voltages at both ends of a shunt resistor connected to the motor driving unit.

[Target Current Setting Unit]

Figure 3:
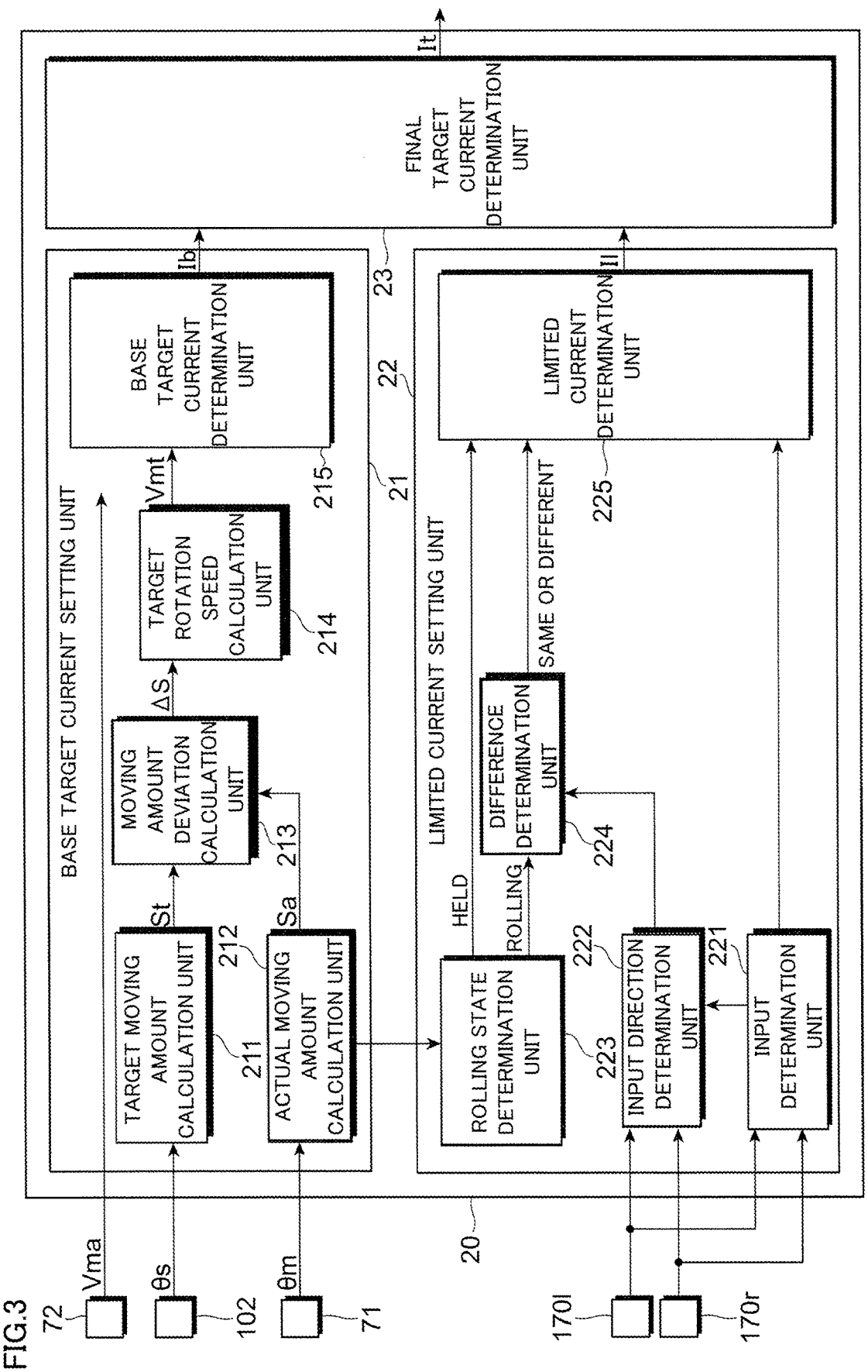
FIG. 3 shows a schematic configuration of a target current setting unit.

FIG. 3 shows a schematic configuration of the target current setting unit 20.

The steering device 100 of the first embodiment uses a so-called steer-by-wire system, in which the steering wheel 101 and the front wheels 2 are not mechanically connected. By nature of the steer-by-wire system, the force applied by the driver on the steering wheel 101 (steering torque) does not directly cause the front wheels 2 to roll. The front wheels 2 are caused to roll by the driving force of the electric motor 110.

Rolling angles of the front wheels 2 need to be controlled in order that the automobile 1 can travel along a target travel line according to the driver's operation of the steering wheel 101. The controller 10 controls the position of the rack shaft 105 for control of the rolling angles of the front wheels 2. That is, the controller 10 controls the position of the rack shaft 105 so that the actual position of the rack shaft 105 corresponds to the driver's steering of the steering wheel 101. More specifically, the controller 10 performs control so that an actual moving amount Sa, which is an actual moving amount (stroke) of the rack shaft 105 from its reference position (the position where the front wheels 2 are at a zero degree rolling angle), equals a target moving amount St, which is a target moving amount (stroke) of the rack shaft 105 according to the driver's steering of the steering wheel 101. When there is a large deviation between the actual moving amount Sa and the target moving amount St, the controller 10 sets a target rotation speed Vmt of the electric motor 110 so as to increase the rotation speed of the electric motor 110. The controller 10 thereby quickly adjusts the actual moving amount Sa to the target moving amount St. In order that an actual rotation speed Vma of the electric motor 110 equals the target rotation speed Vmt, the controller 10 increases the rotation speed of the electric motor 110 with increase in deviation between the actual rotation speed Vma and the target rotation speed Vmt. To achieve this, the target current setting unit 20 increases the target current It, which is a target value of current to be supplied to the electric motor 110, with increase in deviation between the actual rotation speed Vma and the target rotation speed Vmt. Thus, the target current setting unit 20 sets the target current It according to the deviation between the actual rotation speed Vma and the target rotation speed Vmt of the electric motor 110 so that the actual rotation speed Vma equals the target rotation speed Vmt.

In the following case, however, the target current setting unit 20 sets the target current It regardless of the deviation between the actual rotation speed Vma and the target rotation speed Vmt.

As compared to a system in which the steering wheel 101 and the front wheels 2 are mechanically connected, the steer-by-wire system requires that the driving force of the electric motor 110 be increased to make up for the lack of the driver's steering torque that contributes to rolling the front wheels 2. As a result, this increases the capacity of the electric motor 110 to hold the rolling angles of the front wheels 2 i.e. hold the position of the rack shaft 105 when an external force, such as one from the road surface, acts on the front wheels 2 so as to change their rolling angles. In a system in which the front wheels 2 and the steering wheel 101 are mechanically connected, an external force on the front wheels 2 to change their rolling angles is eventually transmitted to the steering wheel 101, whereas in the steer-by-wire system, such force is eventually transmitted to the electric motor 110. For this reason, under application of any instantaneous external force, it is difficult to relieve the force generated on the transmission unit (the deceleration mechanism 111 (the worm wheel 111a and the worm 111b), the pinion shaft 106, and the rack shaft 105) transmitting the driving force of the electric motor 110 to the front wheels 2.

In view of the above, the target current setting unit 20 determines whether any external excessive force greater than or equal to a predetermined force is input, or likely to be input, to the transmission unit (hereinafter may be collectively described as "excessive force is likely to be input"). Upon determination that the excessive force is input, or likely to be input, to the transmission unit (hereinafter may be collectively described as "excessive force is likely to be input"), the target current setting unit 20 reduces the target current It. For example, the predetermined force may be a value determined according to shapes and materials of the components constituting the transmission unit, including the worm wheel 111a, the worm 111b, the pinion shaft 106, and the rack shaft 105. For example, assuming that a current larger than an at-roll limited current Ilt (described later) is being supplied to the electric motor 110, the predetermined force may be the minimum value of the force that damages any component of the transmission unit if applied to the transmission unit in a direction different from that of a force due to the driving force of the electric motor 110 under that current. When at least any one of the worm wheel 111a, the worm 111b, and the rack shaft 105 constituting the transmission unit is made of resin, the predetermined force may be set smaller than when the above components are made of metal.

More specifically, the target current setting unit 20 includes a base target current setting unit 21 and a limited current setting unit 22. The base target current setting unit 21 sets a base target current Ib as a basis for setting the target current It. The limited current setting unit 22 sets a limited current Il in response to a large external force being input. The target current setting unit 20 further includes a final target current setting unit 23 that determines the target current It finally supplied to the electric motor 110.

(Base Target Current Setting Unit)

The base target current setting unit 21 includes a target moving amount calculation unit 211 that calculates the target moving amount St of the rack shaft 105, and an actual moving amount calculation unit 212 that calculates the actual moving amount Sa of the rack shaft 105. The base target current setting unit 21 further includes a moving amount deviation calculation unit 213 that calculates a moving amount deviation ΔS, which is a deviation between the target moving amount St calculated by the target moving amount calculation unit 211 and the actual moving amount Sa calculated by the actual moving amount calculation unit 212. The base target current setting unit 21 further includes a target rotation speed calculation unit 214 that calculates the target rotation speed Vmt of the electric motor 110 using the moving amount deviation ΔS calculated by the moving amount deviation calculation unit 213. The base target current setting unit 21 further includes a base target current determination unit 215 that determines the base target current Ib using the target rotation speed Vmt calculated by the target rotation speed calculation unit 214 and the actual rotation speed Vma calculated by the motor rotation speed calculation unit 72.

Figure 4:
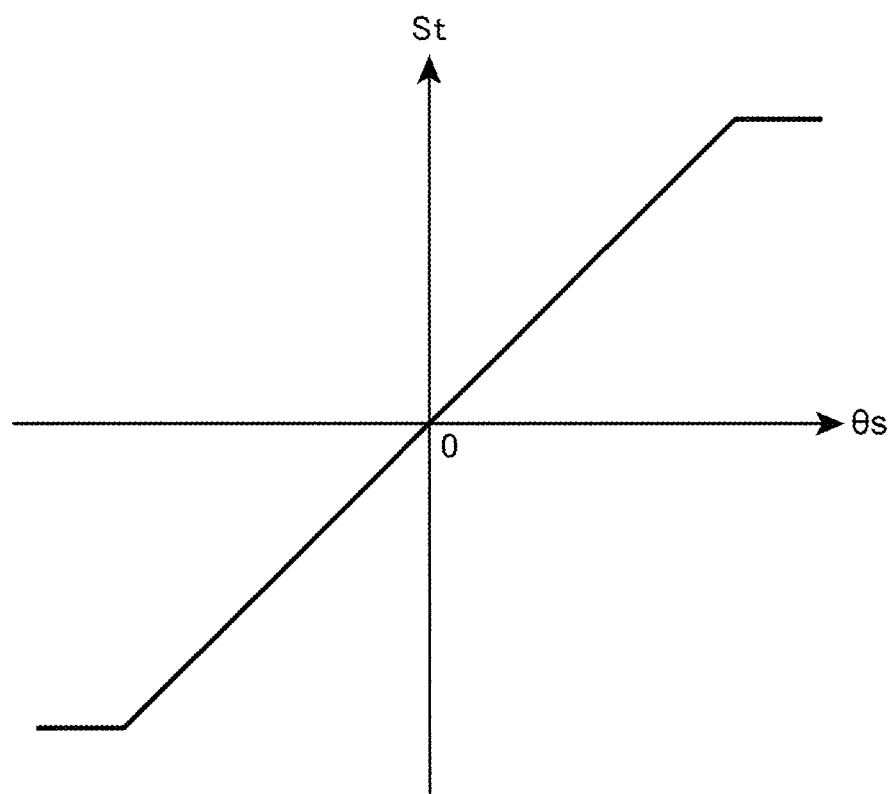
FIG. 4 shows a control map defining relationship between a steering angle and a target moving amount.

FIG. 4 shows a control map defining relationship between the steering angle θs and the target moving amount St.

The target moving amount calculation unit 211 calculates the target moving amount St using the steering angle θs of the steering wheel 101 detected by the steering angle sensor 102. For example, the target moving amount calculation unit 211 calculates the target moving amount St according to the steering angle θs by substituting the steering angle θs into the control map as exemplarily shown in FIG. 4 or a formula defining relationship between the steering angle θs and the target moving amount St. The control map may be empirically created and stored in the ROM in advance, for example.

The actual moving amount calculation unit 212 calculates the actual moving amount Sa using the motor rotation angle θm calculated by the motor rotation angle calculation unit 71. Due to mechanical connection between the electric motor 110, the deceleration mechanism 111, the pinion shaft 106, the rack shaft 105 and the like, there is correlation between the motor rotation angle θm of the electric motor 110 and the actual moving amount Sa of the rack shaft 105. For example, the actual moving amount calculation unit 212 calculates the actual moving amount Sa using the integrated value of differences between a current value and a previous value of the motor rotation angle θm, which is periodically (e.g., every 1 millisecond) calculated by the motor rotation angle calculation unit 71.

The moving amount deviation calculation unit 213 calculates the moving amount deviation ΔS by subtracting the actual moving amount Sa calculated by the actual moving amount calculation unit 212 from the target moving amount St calculated by the target moving amount calculation unit 211 (ΔS=St−Sa).

Figure 5:
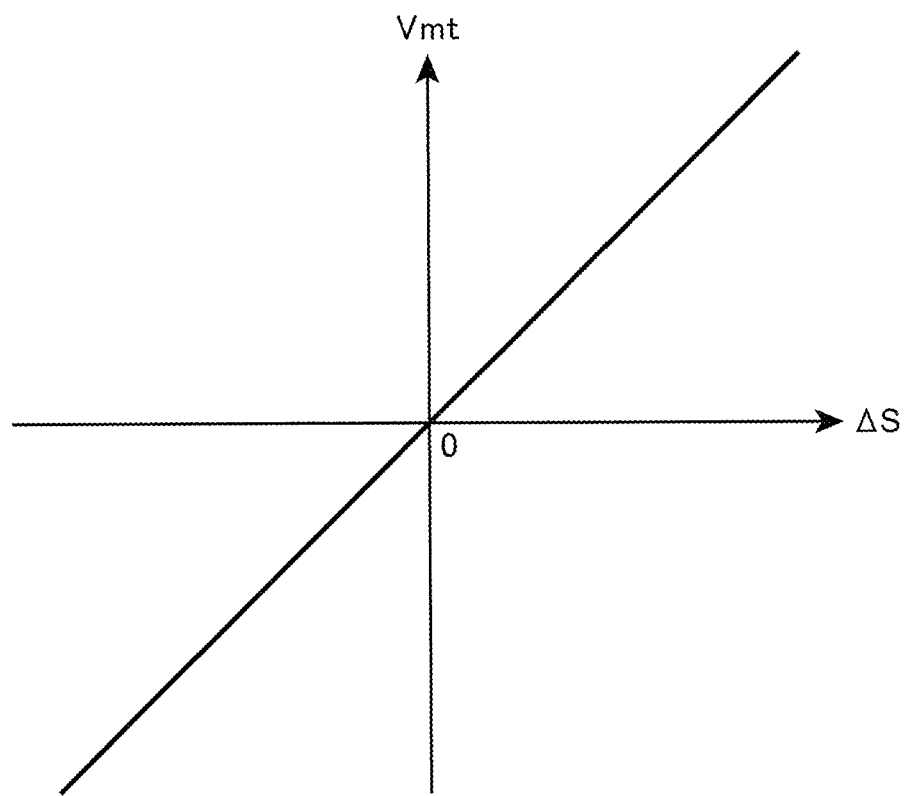
FIG. 5 shows a control map defining relationship between a moving amount deviation and a target rotation speed.

FIG. 5 shows a control map defining relationship between the moving amount deviation ΔS and the target rotation speed Vmt.

The target rotation speed calculation unit 214 calculates the target rotation speed Vmt according to the moving amount deviation ΔS. For example, the target rotation speed calculation unit 214 calculates the target rotation speed Vmt by substituting the moving amount deviation ΔS into the control map as exemplarily shown in FIG. 5 or a formula defining relationship between the moving amount deviation ΔS and the target rotation speed Vmt. The control map may be empirically created and stored in the ROM in advance, for example.

Figure 6:
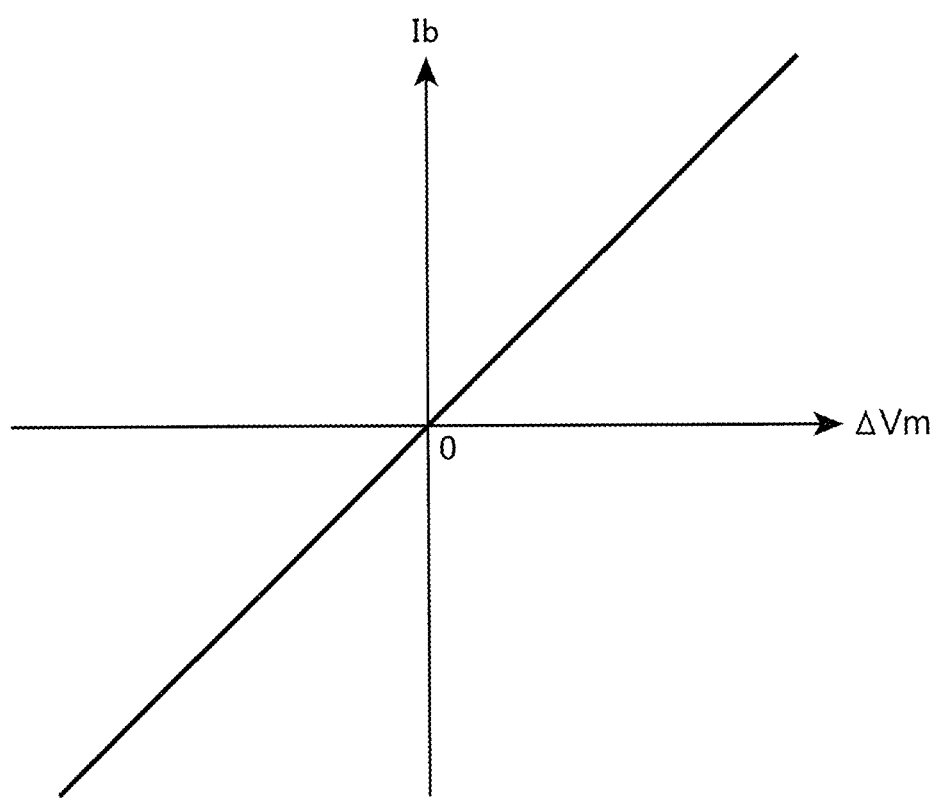
FIG. 6 shows a control map defining relationship between a rotation speed deviation and a base target current.

FIG. 6 shows a control map defining relationship between a rotation speed deviation ΔVm and the base target current Ib.

The base target current determination unit 215 calculates a rotation speed deviation ΔVm (=Vmt−Vma) by subtracting the actual rotation speed Vma calculated by the motor rotation speed calculation unit 72 from the target rotation speed Vmt calculated by the target rotation speed calculation unit 214. For example, the base target current determination unit 215 calculates the base target current Ib by substituting the rotation speed deviation ΔVm into the control map as exemplarily shown in FIG. 6 or a formula defining relationship between the rotation speed deviation ΔVm and the base target current Ib. The control map may be empirically created and stored in the ROM in advance, for example.

When the steering wheel 101 turns to the right from a reference position where the steering angle θs, which is the rotation angle of the steering wheel, is zero degree, the steering angle θs becomes positive. When the steering wheel 101 turns to the left, the steering angle θs becomes negative.

When the base target current Ib causes the electric motor 110 to generate a driving force whereby the rack shaft 105 is moved to the left from its neutral position (the front wheels 2 are rolled to the right) in response to the steering wheel 101 being steered in the direction in which the steering angle θs becomes positive (i.e. in the right-turn direction), the flow direction of such a base target current Ib is defined as a positive direction. On the other hand, when the base target current Ib causes the electric motor 110 to generate a driving force whereby the rack shaft 105 is moved to the right from its neutral position (the front wheels 2 are rolled to the left) in response to the steering wheel 101 being steered in the direction in which the steering angle θs becomes negative (i.e. in the left-turn direction), the flow direction of such a base target current Ib is defined as a negative direction.

Alternatively, the base target current setting unit 21 may set the base target current Ib on the basis of the steering torque of the steering wheel 101.

(Limited Current Setting Unit)

The limited current setting unit 22 includes an input determination unit 221 and an input direction determination unit 222. The input determination unit 221 determines whether an excessive external force, such as one from the road surface, greater than or equal to the predetermined force is likely to be input to the transmission unit. The input direction determination unit 222 determines the direction of the excessive force. The limited current setting unit 22 further includes a rolling state determination unit 223 that determines whether the front wheels 2 are in a rolling state or a held state. The limited current setting unit 22 further includes a difference determination unit 224 that determines whether the direction of the excessive force is the same as, or different from, the rolling or held direction of the front wheels 2. The limited current setting unit 22 further includes a limited current determination unit 225 that determines the limited current Il according to the determination made by the difference determination unit 224.

The input determination unit 221 of the first embodiment determines whether an excessive force is likely to be input, on the basis of the expansion/contraction amount of the left suspension device 4l and the right suspension device 4r.

When the left front wheel 2l hits a bump in the road while the right front wheel 2r does not during traveling of the automobile 1, the left front wheel 2l side end of the left tie rod 104l moves upward and the right tie rod 104r does not move upward or downward. This causes the rack shaft 105 to move to the left. Also, when the left front wheel 2l hits a dip in the road while the right front wheel 2r does not during traveling of the automobile 1, the left front wheel 2l side end of the left tie rod 104l moves downward and the right tie rod 104r does not move upward or downward. This causes the rack shaft 105 to move to the left.

Meanwhile, when the right front wheel 2r hits a bump in the road while the left front wheel 2l does not during traveling of the automobile 1, the right front wheel 2r side end of the right tie rod 104r moves upward and the left tie rod 104l does not move upward or downward. This causes the rack shaft 105 to move to the right. Also, when the right front wheel 2r hits a dip in the road while the left front wheel 2l does not during traveling of the automobile 1, the right front wheel 2r side end of the right tie rod 104r moves downward and the left tie rod 104l does not move upward or downward. This causes the rack shaft 105 to move to the right.

As described above, when one of the left front wheel 2l and the right front wheel 2r moves upward or downward while the other does not during traveling of the automobile 1 on the road with bumps and dips, the rack shaft 105 moves away from the other of the front wheels 2 and closer to the one of the front wheels 2.

With large upward or downward movement of the one of the front wheels 2, the rack shaft 105 also moves by a large amount away from the other of the front wheels 2 and closer to the one of the front wheels 2.

When the electric motor 110 is being driven in one rotational direction to cause the front wheels 2 to roll in one of the right and left rolling directions, any external input to the electric motor 110 that causes the electric motor 110 to rotate in the other rotational direction may put an excessive load on the components of the transmission unit. This is because the force due to the driving force of the electric motor 110 counteracts the force due to the external input, and the components of the transmission unit receive the force due to the external input in a direction opposite to the direction of the force due to the driving force of the electric motor 110.

When the electric motor 110 is being driven in one rotational direction to cause the front wheels 2 to roll in one rolling direction, any external input to the electric motor 110 that causes the electric motor 110 to rotate in the one rotational direction will not put an excessive load on the components of the transmission unit, contrary to the above. This is because the force due to the driving force of the electric motor 110 does not counteract the force due to the external input, and the components of the transmission unit receive the force due to the external input in the same direction as the direction of the force due to the driving force of the electric motor 110.

When the electric motor 110 is applying the driving force in one rotational direction to hold the rolling angles of the front wheels 2, any external input to the electric motor 110 that causes the electric motor 110 to rotate in the other rotational direction may put an excessive load on the components of the transmission unit. This is because the force due to the driving force of the electric motor 110 counteracts the force due to the external input, and the components of the transmission unit receive the force due to the external input in a direction opposite to the direction of the force due to the driving force of the electric motor 110.

When the electric motor 110 is applying the driving force in the other rotational direction to hold the rolling angles of the front wheels 2, any external input to the electric motor 110 that causes the electric motor 110 to rotate in the other rotational direction will not put an excessive load on the components of the transmission unit, contrary to the above. This is because the force due to the driving force of the electric motor 110 does not counteract the force due to the external input, and the components of the transmission unit receive the force due to the external input in the same direction as the direction of the force due to the driving force of the electric motor 110.

The input determination unit 221 bases its determination on the fact that, when one front wheel 2 moves upward or downward by a large amount while the other front wheel 2 moves upward or downward by a small amount, the rack shaft 105 also moves by a large amount from the other front wheel 2 side to the one front wheel 2 side. When a deviation between the absolute value of a change rate of the expansion/contraction amount of the suspension device 4 of the one front wheel 2 and the absolute value of a change rate of the expansion/contraction amount of the suspension device 4 of the other front wheel 2 is equal to or larger than a predetermined rate, the input determination unit 221 determines that an excessive force is likely to be input. On the other hand, when a deviation between the absolute value of a change rate of the expansion/contraction amount of the suspension device 4 of the one front wheel 2 and the absolute value of a change rate of the expansion/contraction amount of the suspension device 4 of the other front wheel 2 is smaller than the predetermined rate, the input determination unit 221 does not determine that an excessive force is likely to be input.

The input direction determination unit 222 bases its determination on the fact that, when one front wheel 2 moves upward or downward by a large amount while the other front wheel 2 moves upward or downward by a small amount, the rack shaft 105 also moves by a large amount from the other front wheel 2 side to the one front wheel 2 side. When the absolute value of a change rate of the expansion/contraction amount of the suspension device 4 of the one front wheel 2 is larger than the absolute value of a change rate of the expansion/contraction amount of the suspension device 4 of the other front wheel 2 by a predetermined change rate or more, the input direction determination unit 222 determines that the rack shaft 105 has moved from the other front wheel 2 side to the one front wheel 2 side and a force has been input in the direction that causes the front wheels 2 to roll toward the other front wheel 2 side.

More specifically, when the absolute value of a change rate of the expansion/contraction amount of the left suspension device 4l is larger than the absolute value of a change rate of the expansion/contraction amount of the right suspension device 4r by a predetermined change rate or more, the input direction determination unit 222 determines that the rack shaft 105 has moved from the right front wheel 2r side to the left front wheel 2l side (i.e., in the left direction) and a force has been input in the direction that causes the front wheels 2 to roll to the right. Meanwhile, when the absolute value of a change rate of the expansion/contraction amount of the right suspension device 4r is larger than the absolute value of a change rate of the expansion/contraction amount of the left suspension device 4l by a predetermined change rate or more, the input direction determination unit 222 determines that the rack shaft 105 has moved from the left front wheel 2l side to the right front wheel 2r side (i.e., in the right direction) and a force has been input in the direction that causes the front wheels 2 to roll to the left.

The rolling state determination unit 223 determines whether the front wheels 2 are rolling or being held, on the basis of the actual moving amount Sa calculated by the actual moving amount calculation unit 212. Upon determination that the front wheels 2 are rolling, the rolling state determination unit 223 further determines whether the front wheels 2 are rolling to the right or left.

The rolling state determination unit 223 also calculates a change rate Vsa of the actual moving amount Sa calculated by the actual moving amount calculation unit 212. When the absolute value of the calculated change rate Vsa is equal to or below a predetermined value α (|Vsa|≤α), the rolling state determination unit 223 determines that the front wheels 2 are being held. Then, the rolling state determination unit 223 outputs information to the limited current determination unit 225 to the effect that the front wheels 2 are being held.

When the absolute value of the calculated change rate Vsa is larger than the predetermined value α (|Vsa|>α), the rolling state determination unit 223 determines that the front wheels 2 are rolling. When the sign of the change rate Vsa is positive, the rolling state determination unit 223 determines that the front wheels 2 are rolling to the left. Then, the rolling state determination unit 223 outputs information to that effect to the difference determination unit 224. On the other hand, when the sign of the calculated change rate Vsa is negative, the rolling state determination unit 223 determines that the front wheels 2 are rolling to the right. Then, the rolling state determination unit 223 outputs information to that effect to the difference determination unit 224.

In this manner, the rolling state determination unit 223 determines whether the front wheels 2 are being held and whether the front wheels 2 are rolling to the right or left.

The predetermined value α is a value to set a dead zone. The predetermined value α may be zero.

The difference determination unit 224 determines whether the input direction determined by the input direction determination unit 222 and the rolling direction determined by the rolling state determination unit 223 are the same as or different from each other.

More specifically, when the input direction determination unit 222 determines that a force has been input in the direction that causes the front wheels 2 to roll to the left and the rolling state determination unit 223 determines that the front wheels 2 are rolling to the left, the difference determination unit 224 determines that the input direction and the rolling direction are the same as each other. On the other hand, when the input direction determination unit 222 determines that a force has been input in the direction that causes the front wheels 2 to roll to the left and the rolling state determination unit 223 determines that the front wheels 2 are rolling to the right, the difference determination unit 224 determines that the input direction and the rolling direction are different from each other.

When the input direction determination unit 222 determines that a force has been input in the direction that causes the front wheels 2 to roll to the right and the rolling state determination unit 223 determines that the front wheels 2 are rolling to the right, the difference determination unit 224 determines that the input direction and the rolling direction are the same as each other. On the other hand, when the input direction determination unit 222 determines that a force has been input in the direction that causes the front wheels 2 to roll to the right and the rolling state determination unit 223 determines that the front wheels 2 are rolling to the left, the difference determination unit 224 determines that the input direction and the rolling direction are different from each other.

When the input determination unit 221 does not determine that an excessive force is likely to be input, the limited current determination unit 225 sets the limited current Il to be infinite and outputs the set limited current Il to the final target current determination unit 23.

When the input determination unit 221 determines that an excessive force is likely to be input, the limited current determination unit 225 sets the limited current Il as described below and outputs the set limited current Il to the final target current determination unit 23.

In response to the difference determination unit 224 determining that the input direction and the rolling direction are the same, the limited current determination unit 225 sets the limited current Il to be infinite and outputs the set limited current Il to the final target current determination unit 23. On the other hand, in response to the difference determination unit 224 determining that the input direction and the rolling direction are different from each other, the limited current determination unit 225 sets the limited current Il to a predetermined at-roll limited current Ilt. The at-roll limited current Ilt is set to an upper limit value below or at which any input of excessive force during supply of the at-roll limited current Ilt to the electric motor 110 does not cause damage to the components of the transmission unit. The at-roll limited current Ilt is an upper limit current that can be supplied to the electric motor 110. The upper limit is preset according to the strength of the components of the transmission unit. That is, the at-roll limited current Ilt is a current at which any input of excessive force during supply of the at-roll limited current Ilt to the electric motor 110 does not produce a load on the transmission unit exceeding an allowable upper limit that is preset according to the strength of the components of the transmission unit to prevent damage to the components. Note that the at-roll limited current Ilt takes a positive value.

Meanwhile, in response to the rolling state determination unit 223 determining that the front wheels 2 are being held, the limited current determination unit 225 sets the limited current Il to a predetermined at-hold limited current Ilh. The at-hold limited current Ilh is set to an upper limit value at or below which any input of excessive force during supply of the at-hold limited current Ilh to the electric motor 110 does not cause damage to the components of the transmission unit. The at-hold limited current Ilh is an upper limit current that can be supplied to the electric motor 110. The upper limit is preset according to the strength of the components of the transmission unit. That is, the at-hold limited current Ilh is a current at which any input of excessive force during supply of the at-hold limited current Ilh to the electric motor 110 does not produce a load on the transmission unit exceeding an allowable upper limit that is preset according to the strength of the components of the transmission unit to prevent damage to the components. Note that the at-hold limited current Ilh takes a positive value.

When the absolute value of the base target current Ib set by the base target current setting unit 21 is smaller than the limited current Il, the final target current determination unit 23 determines the base target current Ib as the target current It. For example, when the limited current setting unit 22 sets the limited current Il to be infinite, the final target current determination unit 23 determines the base target current Ib set by the base target current setting unit 21 as the target current It. Also, when the rotation speed deviation ΔVm is small and the base target current Ib is set to a small value, the absolute value of the base target current Ib becomes smaller than the limited current Il despite it not being set to be infinite by the limited current setting unit 22. In this case too, the final target current determination unit 23 determines the base target current Ib as the target current It.

When the absolute value of the base target current Ib set by the base target current setting unit 21 is equal to or larger than the limited current Il, the final target current determination unit 23 determines the target current It on the basis of the limited current Il set by the limited current setting unit 22. For example, when the sign of the base target current Ib set by the base target current setting unit 21 is positive, the final target current determination unit 23 determines the limited current Il output from the limited current setting unit 22 as the target current It. When the sign of the base target current Ib set by the base target current setting unit 21 is negative, the final target current determination unit 23 determines, as the target current It, a value derived by multiplying the limited current Il output from the limited current setting unit 22 by −1.

Referring to a flowchart, a description will be given of a target current setting process performed by the target current setting unit 20.

Figure 7:
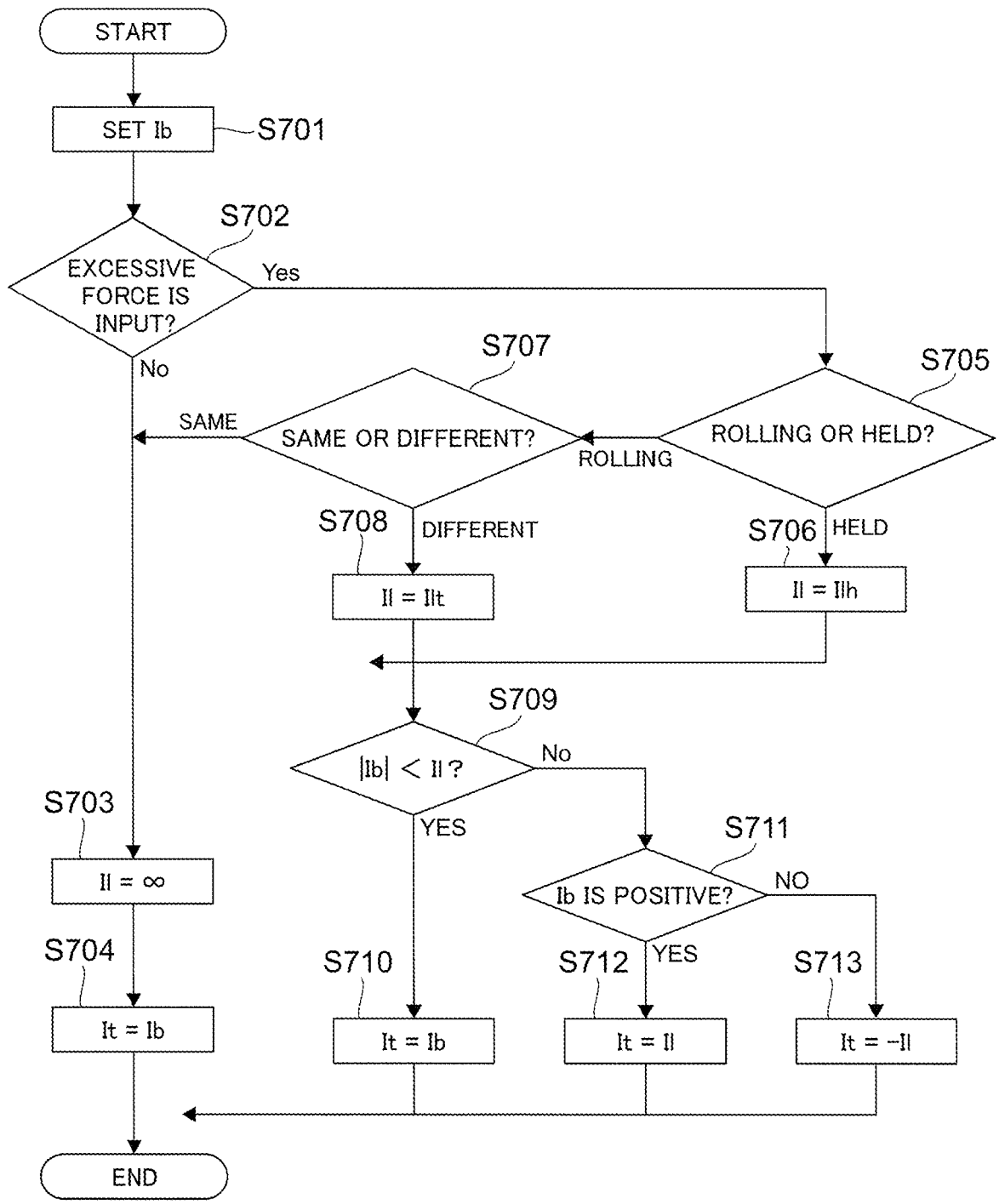
FIG. 7 is a flowchart of a target current setting process performed by the target current setting unit.

FIG. 7 is a flowchart of a target current setting process performed by the target current setting unit 20.

The target current setting unit 20 performs this target current setting process for e.g., every predetermined period (e.g., 1 millisecond).

First, the base target current setting unit 21 sets the base target current Ib in the aforementioned manner (S701).

The input determination unit 221 then determines whether an excessive force is likely to be input (S702). When an excessive force is not likely to be input (No in S702), the limited current determination unit 225 sets the limited current Il to be infinite and outputs it to the final target current determination unit 23 (S703). As the absolute value of the base target current Ib set in S701 is smaller than the limited current Il, the final target current determination unit 23 determines the base target current Ib as the target current It (It=Ib) (S704).

Meanwhile, when an excessive force is likely to be input (Yes in S702), the rolling state determination unit 223 determines whether the front wheels 2 are rolling or being held (S705). When the front wheels 2 are determined as being held in S705, the limited current determination unit 225 determines the at-hold limited current Ilh as the limited current Il (S706). When the front wheels 2 are determined as rolling in S705, the difference determination unit 224 determines whether the input direction determined by the input direction determination unit 222 and the rolling direction determined by the rolling state determination unit 223 are the same as or different from each other (S707). When these directions are determined as being the same in S707, the process goes to S703 and then S704. When these directions as determined as being different from each other, the limited current determination unit 225 determines the at-roll limited current Ilt as the limited current Il (S708).

After the limited current Il is determined in S706 or S708, it is determined whether the absolute value of the base target current Ib is smaller than the limited current Il (S709). When the absolute value of the base target current Ib is smaller than the limited current Il (Yes in S709), the final target current determination unit 23 determines the base target current Ib set in S701 as the target current It (It=Ib) (S710).

Meanwhile, when the absolute value of the base target current Ib is equal to or larger than the limited current Il (No in S709), it is determined whether the sign of the base target current Ib set in S701 is positive (S711). When the sign of the base target current Ib is positive (Yes in S711), the final target current determination unit 23 determines the limited current Il output from the limited current setting unit 22 as the target current It (It=Il) (S712). When the sing of the base target current Ib is negative (No in S711), the final target current determination unit 23 determines, as the target current It, a value derived by multiplying the limited current Il output from the limited current setting unit 22 by −1 (It=−Il) (S713).

As described above, the steering device 100 includes: the electric motor 110 configured to apply a driving force to cause the front wheels 2, as an example of the wheel, to roll; the deceleration mechanism 111, the pinion shaft 106, the rack shaft 105, and the tie rods 104 as an example of the transmission unit transmitting the driving force of the electric motor 110 to the front wheels 2; and the input determination unit 221 configured to determine whether an excessive external force equal to or greater than a predetermined force is likely to be input to the transmission unit via the front wheels 2 while the electric motor 110 is applying the driving force. The steering device 100 further includes the final target current determination unit 23 as an example of the reduction unit configured to, in response to the input determination unit 221 determining that the excessive force is likely to be input, reduce the driving force of the electric motor 110 so that a load on the transmission unit does not exceed an upper limit that is preset according to the strength of the transmission unit.

The final target current determination unit 23 determines the target current It such that its absolute value equals the limited current Il (S712 or S713) when the following conditions are met, namely: the input determination unit 221 determines that an excessive force is likely to be input (Yes in S702); the limited current determination unit 225 determines the at-roll limited current Ilt or the at-hold limited current Ilh as the limited current Il (S706 or S708); and the absolute value of the base target current Ib is equal to or greater than the limited current Il (No in S709). To put the above another way, the final target current determination unit 23 reduces the driving force of the electric motor 110 so that the driving force does not exceed the upper limit value (i.e., the upper limit driving force produced by the above upper limit current) that is preset according to the strength of the transmission unit transmitting the driving force to the front wheels 2.

When an excessive force is likely to be input, the above-configured steering device 100 reduces the driving force of the electric motor 110 so that the load on the transmission unit does not exceed the upper limit value that is preset according to the strength of the transmission unit. This can reduce the load on the transmission unit. As the load on the transmission unit can be reduced even under the input of the excessive force, there is no need to increase the size of the components of the transmission unit nor to use high strength materials for them. This can make the steering device 100 compact and lightweight.

The steering device 100 further includes the difference determination unit 224 configured to, in response to the input determination unit 221 determining that an excessive force is likely to be input, determines whether the direction of the excessive force acting on the transmission unit and the direction of the force acting on the transmission unit due to the driving force of the electric motor 110 are the same as or different from each other.

In response to the difference determination unit 224 determining that the above directions are different from each other, the final target current determination unit 23 reduces the driving force. Specifically, in response to the difference determination unit 224 determining that the above directions are different from each other ("Different" in S707), the limited current determination unit 225 determines the preset at-roll limited current Ilt as the limited current Il (S708). Then, when the absolute value of the base target current Ib set by the base target current setting unit 21 is equal to or greater than the limited current Il (No in S709), the final target current determination unit 23 determines the target current It such that its absolute value equals the limited current Il (the at-roll limited current Ilt) (S712 or S713). This allows to more accurately reduce the driving force of the electric motor 110, which can reduce the load on the transmission unit.

In response to the difference determination unit 224 determining that the above directions are the same, the final target current determination unit 23 does not reduce the driving force. Specifically, in response to the difference determination unit 224 determining that the above directions are the same ("Same" in S707), the limited current determination unit 225 determines the limited current Il to be infinite (S703). As the absolute value of the base target current Ib set by the base target current setting unit 21 is smaller than the limited current Il, the final target current determination unit 23 determines the base target current Ib as the target current It (S704).

The input determination unit 221 of the first embodiment makes its determination based on the state of the suspension devices 4 between the respective front wheels 2 and the vehicle body. Specifically, when a deviation between the absolute value of a change rate of the expansion/contraction amount of the suspension device 4 of the one front wheel 2 and the absolute value of a change rate of the expansion/contraction amount of the suspension device 4 of the other front wheel 2 is equal to or larger than a predetermined rate, the input determination unit 221 determines that an excessive force is likely to be input. This allows for determination using output signals from the left stroke sensor 170l and the right stroke sensor 170r, which are usually provided to the automobile 1. This can reduce the cost in making the determination, as compared to using a dedicated sensor.

In the above embodiment, when the absolute value of the base target current Ib set by the base target current setting unit 21 is smaller than the limited current Il set by the limited current setting unit 22, the final target current determination unit 23 determines the base target current Ib set by the base target current setting unit 21 as the target current It. The way of determination by the base target current setting unit 21 is, however, not limited to this. For example, when the limited current setting unit 22 sets a value other than infinity as the limited current Il, the final target current determination unit 23 may determine the limited current Il set by the limited current setting unit 22 as the target current It, regardless of the value of the base target current Ib set by the base target current setting unit 21. In this case, the limited current setting unit 22 may not set, as the limited current Il, an upper limit value (the at-roll limited current Ilt or the at-hold limited current Ilh) below or at which any input of excessive force during supply of the limited current Il to the electric motor 110 does not cause damage to the components of the transmission unit. The limited current setting unit 22 may set a value smaller than the above upper limit value (the at-roll limited current Ilt or the at-hold limited current Ilh). For example, the limited current setting unit 22 may set, as the limited current Il, a value smaller than 50 percent of the above upper limit value (the at-roll limited current Ilt or the at-hold limited current Ilh). This allows to more accurately reduce the load on the transmission unit. The limited current setting unit 22 may set, as the limited current Il, a value smaller than the above upper limit value (the at-roll limited current Ilt or the at-hold limited current Ilh) to the extent that steering stability is not negatively affected by the return of the front wheels 2 due to input of an excessive force.

Second Embodiment

The controller 10 of the automobile 1 of the second embodiment differs from that of the first embodiment in terms of its configuration corresponding to the input determination unit 221 and the input direction determination unit 222. The below description will focus on the difference from the first embodiment. The like parts in the first and the second embodiments are denoted by the same reference numerals, and detailed description thereof will be omitted.

Figure 8:
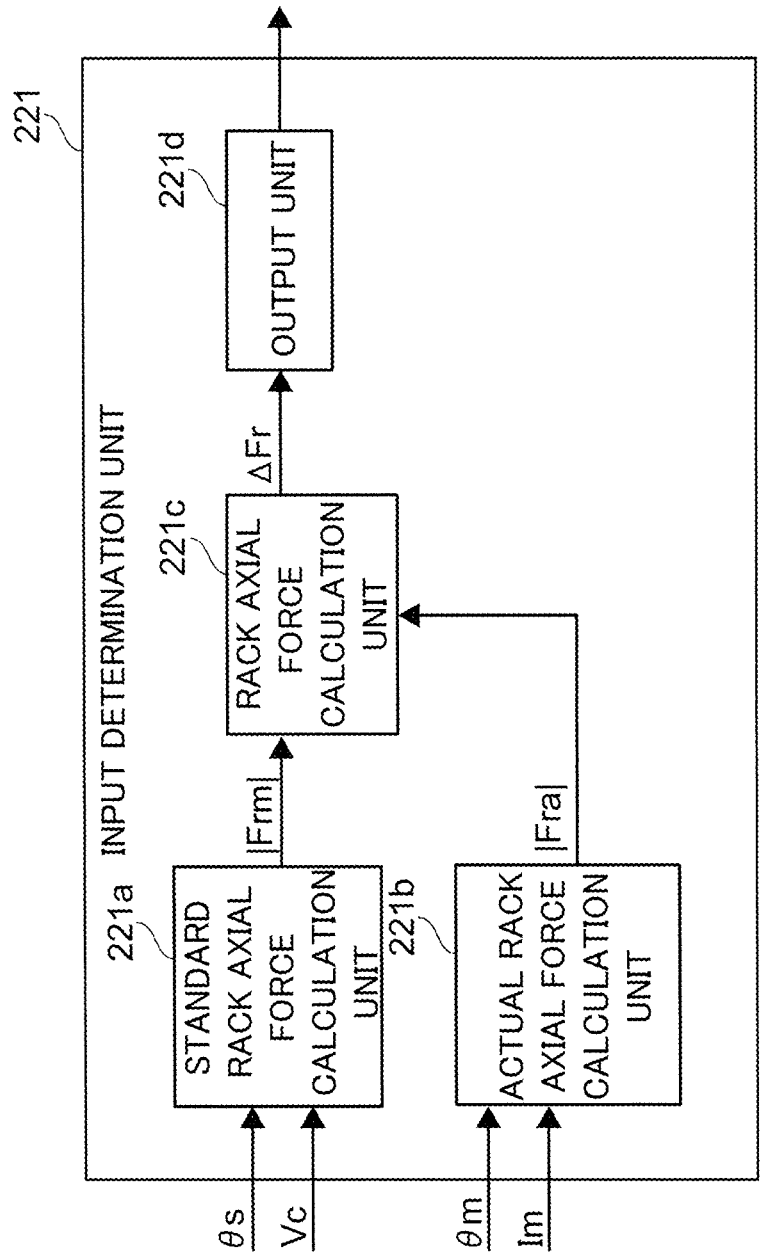
FIG. 8 shows a schematic configuration of an input determination unit of the second embodiment.

FIG. 8 shows a schematic configuration of the input determination unit 221 of the second embodiment.

The input determination unit 221 of the second embodiment determines whether an excessive force is likely to be input, on the basis of the absolute value of a standard rack axial force Frm, which is a standard axial force generated on the rack shaft 105, and the absolute value of an actual rack axial force Fra, which is an actual axial force generated on the rack shaft 105. As shown in FIG. 8, the input determination unit 221 of the second embodiment includes a standard rack axial force calculation unit 221a that calculates the absolute value |Frm| of the standard rack axial force Frm, and an actual rack axial force calculation unit 221b that calculates the absolute value |Fra| of the actual rack axial force Fra. The input determination unit 221 further includes a rack axial force deviation calculation unit 221c that calculates a rack axial force deviation ΔFr, which is a deviation between the absolute value |Frm| of the standard rack axial force Frm calculated by the standard rack axial force calculation unit 221a and the absolute value |Fra| of the actual rack axial force Fra calculated by the actual rack axial force calculation unit 221b. The input determination unit 221 further includes an output unit 221d that outputs results as to whether an excessive force is likely to be input, on the basis of the rack axial force deviation ΔFr calculated by the rack axial force deviation calculation unit 221c.

The standard rack axial force calculation unit 221a calculates the standard rack axial force Frm on the basis of the steering angle θs detected by the steering angle sensor 102 and the vehicle speed Vc, which is a moving speed of the automobile 1, detected by a vehicle speed sensor (not shown) and input to the standard rack axial force calculation unit 221a via the CAN. That is, the standard rack axial force calculation unit 221a calculates the standard rack axial force Frm according to the steering angle θs and the vehicle speed Vc. For example, the standard rack axial force calculation unit 221a calculates the standard rack axial force Frm by substituting the steering angle θs and the vehicle speed Vc into a control map defining relationship of the steering angle θs and the vehicle speed Vc with the standard rack axial force Frm. The control map may be empirically created and stored in the ROM in advance, for example. The standard rack axial force calculation unit 221a then calculates the absolute value |Frm| of the standard rack axial force Frm.

The actual rack axial force calculation unit 221b calculates the actual rack axial force Fra on the basis of the motor rotation angle θm calculated by the motor rotation angle calculation unit 71 and the actual current Im detected by the motor current detection unit. The actual rack axial force calculation unit 221b then calculates the absolute value |Fra| of the actual rack axial force Fra.

Given the steering device 100 being a pinion type device, the actual rack axial force Fra can be assumed to be equal to the axial force given by the pinion shaft 106. Accordingly, the actual rack axial force Fra is calculated on the basis of pinion torque Tp applied to the pinion shaft 106. The actual rack axial force Fra is a value derived by dividing the pinion torque Tp by a pitch circle radius rp of the pinion 106a (Fra=Tp/rp).

The pinion torque Tp is a value derived by multiplying an output shaft torque To, which is torque output from the electric motor 110, by a deceleration ratio (gear ratio) N of the deceleration mechanism 111 (Tp=To×N).

The output shaft torque To can be calculated by substituting the motor rotation angle θm calculated by the motor rotation angle calculation unit 71 and the actual current Im detected by the motor current detection unit into a formula prestored in the ROM. Instead of the one calculated by the motor rotation angle calculation unit 71, the motor rotation angle θm may be calculated from a motor counter electromotive force using a predetermined formula.

The rack axial force deviation calculation unit 221c calculates the rack axial force deviation ΔFr by subtracting the absolute value |Frm| of the standard rack axial force Frm calculated by the standard rack axial force calculation unit 221*a* from the absolute value |Fra| of the actual rack axial force Fra calculated by the actual rack axial force calculation unit 221*b* (ΔFr=|Fra|−|Frm|).

When the rack axial force deviation ΔFr is larger than a predetermined value J (ΔFr>J), the output unit 221*d* determines that an excessive force is likely to be input, and outputs information to that effect to the limited current determination unit 225. When the rack axial force deviation ΔFr is equal to or smaller than the predetermined value J (ΔFr≤J), the output unit 221*d* determines that an excessive force is not likely to be input, and outputs information to that effect to the limited current determination unit 225.

When the sign of the change rate Vsa of the actual moving amount Sa calculated by the actual moving amount calculation unit 212 is positive, the input direction determination unit 222 of the second embodiment determines that a force has been input in the direction that causes the front wheels 2 to roll to the left. When, on the other hand, the sign of the change rate Vsa of the actual moving amount Sa calculated by the actual moving amount calculation unit 212 is negative, the input direction determination unit 222 determines that a force has been input in the direction that causes the front wheels 2 to roll to the right.

In this way, the input determination unit 221 and the input direction determination unit 222 of the second embodiment determine whether an excessive force is likely to be input to the components of the transmission unit and determine the direction of such input, on the basis of the force generated on the rack shaft 105, which is one of the components of the transmission unit transmitting the driving force of the electric motor 110 to the front wheels 2. Thus, the input determination unit 221 and the input direction determination unit 222 can make more accurate determination. This allows to more accurately reduce the load on the transmission unit.

Third Embodiment

The controller 10 of the automobile 1 of the third embodiment differs from that of the first embodiment in terms of the determination method used by the input determination unit 221 and the input direction determination unit 222.

The input determination unit 221 of the third embodiment determines whether an excessive force has been input, on the basis of output values from a lateral G sensor (not shown) detecting acceleration of the automobile 1 in the lateral direction. The output values are fed to the input determination unit 221 via the CAN. For example, when the absolute value of the lateral acceleration detected by the lateral G sensor is equal to or larger than predetermined acceleration, the input determination unit 221 of the third embodiment determines that an excessive force has been input.

The input direction determination unit 222 of the third embodiment determines the direction of the excessive force on the basis of the output values from the lateral G sensor (not shown). For example, when the lateral acceleration detected by the lateral G sensor is to the right, the input direction determination unit 222 of the third embodiment determines that an excessive force has occurred in the direction that causes the front wheels 2 to roll to the right. When, on the other hand, the lateral acceleration detected by the lateral G sensor is to the left, the input direction determination unit 222 of the third embodiment determines that an excessive force has occurred in the direction that causes the front wheels 2 to roll to the left.

In this way, the input determination unit 221 and the input direction determination unit 222 of the third embodiment makes determination using the detected values of the lateral G sensor, which is usually provided to the automobile 1. This can reduce the cost in making the determination, as compared to using a dedicated sensor.

Fourth Embodiment

The controller 10 of the automobile 1 of the fourth embodiment differs from that of the first embodiment in terms of the determination method used by the input determination unit 221 and the input direction determination unit 222.

The input determination unit 221 of the fourth embodiment determines whether an excessive force has been input, on the basis of pressure signals from a pressure sensor (not shown) detecting pressure on the front wheels 2 (tire pressure). The pressure signals are fed to the input determination unit 221 via the CAN. For example, the input determination unit 221 of the fourth embodiment bases its determination on the fact that, when one of the left front wheel 21 and the right front wheel 2*r* hits a bump in the road while the other of the front wheels 2 does not during traveling of the automobile 1, only pressure on the one of the front wheels 2 increases. When deviation between pressure on the one of the front wheels 2 and pressure on the other of the front wheels 2 is equal to or larger than predetermined pressure, the input determination unit 221 of the fourth embodiment determines that an excessive force has been input.

The input direction determination unit 222 of the fourth embodiment determines the direction of the excessive force on the basis of pressure signals from the pressure sensor (not shown) detecting pressure on the front wheels 2 (tire pressure). For example, the input direction determination unit 222 of the fourth embodiment bases its determination on the fact that, when one of the left front wheel 21 and the right front wheel 2*r* hits a bump in the road while the other of the front wheels 2 does not during traveling of the automobile 1, only pressure on the one of the front wheels 2 increases. When pressure on the one of the front wheels 2 is equal to or larger than pressure on the other of the front wheels 2, the input direction determination unit 222 of the fourth embodiment determines that the rack shaft 105 has moved from the other wheel 2 side to the one wheel 2 side and a force has been input in the direction that causes the front wheels 2 to roll to the other wheel 2 side.

In this way, the input determination unit 221 and the input direction determination unit 222 of the fourth embodiment makes determination using detection values of the pressure sensor, which is usually provided to the automobile 1. This can reduce the cost in making the determination, as compared to using a dedicated sensor.

Fifth Embodiment

Figure 9:
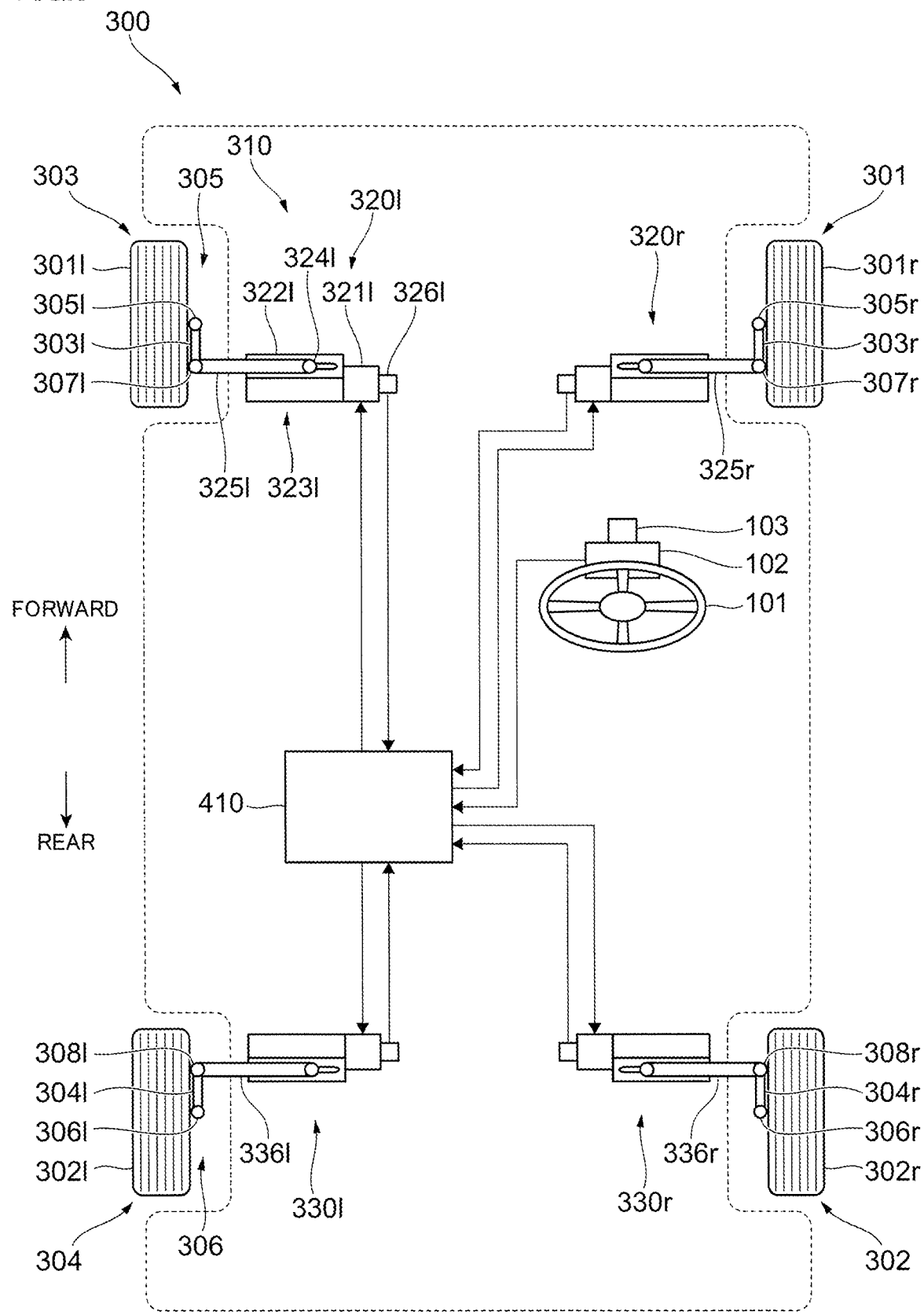
FIG. 9 shows a schematic configuration of an automobile of the fifth embodiment.

FIG. 9 shows a schematic configuration of an automobile 300 of the fifth embodiment. FIG. 9 shows the automobile 300 as viewed from above.

The automobile 300 of the fifth embodiment differs from the automobile 1 of the first embodiment in terms of its configuration corresponding to the steering device 100. The below description will focus on the difference from the automobile 1 of the first embodiment. The parts in the automobile 1 of the first embodiment and the automobile 300 of the fifth embodiment having the same shape or function are denoted by the same reference numerals, and detailed description thereof will be omitted.

The automobile 300 includes front wheels 301 and rear wheels 302 as examples of the wheel, front knuckle arms 303 fixed to the respective front wheels 301, and rear knuckle arms 304 fixed to the respective rear wheels 302. The automobile 300 further includes front suspension devices 305 whose one ends are coupled with a vehicle body (not shown) and whose other ends are coupled with the respective front knuckle arms 303. The front suspension devices 305 absorb shocks and vibrations from road surfaces. The automobile 300 further includes rear suspension devices 306 whose one ends are coupled with the vehicle body (not shown) and whose other ends are coupled with the respective rear knuckle arms 304. The rear suspension devices 306 absorb shocks and vibrations from road surfaces. The front wheels 301, the rear wheels 302, the front knuckle arms 303, the rear knuckle arms 304, the front suspension devices 305, and the rear suspension devices 306 are provided on left and right sides of the automobile 300. Hereinafter, the front wheel 301, the rear wheel 302, the front knuckle arm 303, the rear knuckle arm 304, the front suspension device 305, and the rear suspension device 306 provided on the left side of the automobile 300 (the left side in FIG. 9) may be referred to as a left front wheel 301*l*, a left rear wheel 302*l*, a left front knuckle arm 303*l*, a left rear knuckle arm 304*l*, a left front suspension device 305*l*, and a left rear suspension device 306*l*, respectively. Also, the front wheel 301, the rear wheel 302, the front knuckle arm 303, the rear knuckle arm 304, the front suspension device 305, and the rear suspension device 306 provided on the right side of the automobile 300 (the right side in FIG. 9) may be referred to as a right front wheel 301*r*, a right rear wheel 302*r*, a right front knuckle arm 303*r*, a right rear knuckle arm 304*r*, a right front suspension device 305*r*, and a right rear suspension device 306*r*, respectively.

As shown in FIG. 9, the left front knuckle arm 303*l* and the right front knuckle arm 303*r* extend backwards and include a left front pin 307*l* and a right front pin 307*r* at their respective rear ends. The axial direction of the left front pin 307*l* and the right front pin 307*r* is vertical. As shown in FIG. 9, the left rear knuckle arm 304*l* and the right rear knuckle arm 304*r* extend forward and include a left rear pin 308*l* and a right rear pin 308*r* at their respective front ends. The axial direction of the left rear pin 308*l* and the right rear pin 308*r* is vertical.

A steering device 310 of the fifth embodiment includes a left front steering mechanism 320*l*, a right front steering mechanism 320*r*, a left rear steering mechanism 330*l*, and a right rear steering mechanism 330*r* for individually steering the left front wheel 301*l*, the right front wheel 301*r*, the left rear wheel 302*l*, and the right rear wheel 302*r*, respectively. The left front steering mechanism 320*l*, the right front steering mechanism 320*r*, the left rear steering mechanism 330*l*, and the right rear steering mechanism 330*r* have the substantially same mechanism. Below a description will be given of the left front steering mechanism 320*l* as a representative of these.

The left front steering mechanism 320*l* includes a left front electric motor 321*l*, a left front drive shaft 322*l*, and a left front transmission mechanism 323*l* converting the rotation of the left front electric motor 321*l* into linear motion of the left front drive shaft 322*l*. For example, the left front transmission mechanism 323*l* includes a left front shaft (not shown) formed with a pinion constituting a rack and pinion mechanism together with rack teeth formed on the left front drive shaft 322*l*, and a left front deceleration mechanism (not shown) decelerating the rotation of the left front electric motor 321*l* before transmitting it to the left front shaft. The left front deceleration mechanism includes, for example, a left front worm wheel (not shown) fixed to the left front shaft, and a left front worm (not shown) coupled with an output shaft of the left front electric motor 321*l* via a shaft coupling (not shown).

The left front steering mechanism 320*l* further includes a left front coupling pin 3241 provided to the left front drive shaft 322*l* such that the axial direction of the left front coupling pin 3241 is vertical, and a left front coupling rod 325*l* coupled with the left front pin 307*l* of the left front knuckle arm 303*l*. The left front coupling rod 325*l* and the left front coupling pin 3241, and the left front coupling rod 325*l* and the left front pin 307*l* are coupled by a ball joint coupling.

The left front electric motor 321*l* applies a rotary force to the left front shaft (not shown), thereby applying a driving force to the left front drive shaft 322*l*, which in turn causes the left front wheel 301*l* to roll. The left front electric motor 321*l* of the fifth embodiment is a three-phase brushless motor including a left front resolver 3261 that outputs a rotation angle signal θms depending on a motor rotation angle θm, which is a rotation angle of the left front electric motor 321*l*.

The steering device 310 of the fifth embodiment further includes a controller 410 to control operations of the respective electric motors of the left front steering mechanism 320*l*, the right front steering mechanism 320*r*, the left rear steering mechanism 330*l*, and the right rear steering mechanism 330*r* (e.g., the left front electric motor 321*l* of the left front steering mechanism 320*l*). The controller 410 receives output signals from the aforementioned steering angle sensor 102, resolvers (e.g., the left front resolver 3261 of the left front steering mechanism 320*l*).

The above-configured steering device 310 controls driving of the electric motors (e.g., the left front electric motor 321*l* of the left front steering mechanism 320*l*) of the respective steering mechanisms (e.g., the left front steering mechanism 320*l*) on the basis of the steering angle θs detected by the steering angle sensor 102. The driving force (generated torque) of the electric motors (e.g., the left front electric motor 321*l* of the left front steering mechanism 320*l*) is transmitted to the respective knuckle arms (e.g., the left front knuckle arm 303*l*) through the respective transmission mechanisms (e.g., the left front transmission mechanism 323*l* of the left front steering mechanism 320*l*) and the respective coupling rods (e.g., the left front coupling rod 325*l* of the left front steering mechanism 320*l*). The knuckle arms applied with the force cause the wheels (e.g., the left front wheel 301*l*) to roll, whereby the traveling direction of the automobile 300 is changed. Each transmission mechanism (e.g., the left front transmission mechanism 323*l* of the left front steering mechanism 320*l*) and each coupling rod (e.g., the left front coupling rod 325*l* of the left front steering mechanism 320*l*) are components (elements) that constitute a transmission unit to transmit the driving force of the corresponding electric motor (e.g., the left front electric motor 321*l* of the left front steering mechanism 320*l*) to the corresponding wheel (e.g., the left front wheel 301*l*).

The automobile 300 of the present embodiment is configured such that when the left front coupling rod 325*l* moves from a neutral position (position where the left front wheel 301*l* is at a zero degree rolling angle) to the right during the automobile 300 moving forward, the left front wheel 301*l* rolls (turns) to the left. On the other hand, when the left front coupling rod 325*l* moves from the neutral position to the left, the left front wheel 301*l* rolls (turns) to the right.

Also, when the right front coupling rod 325r moves from a neutral position (position where the right front wheel 301r is at a zero degree rolling angle) to the right during the automobile 300 moving forward, the right front wheel 301r rolls (turns) to the left. On the other hand, when the right front coupling rod 325r moves from the neutral position to the left, the right front wheel 301r rolls (turns) to the right.

Also, when the left rear coupling rod 336l moves from a neutral position (position where the left rear wheel 302l is at a zero degree rolling angle) to the right during the automobile 300 moving forward, the left rear wheel 302l rolls (turns) to the right. On the other hand, when the left rear coupling rod 336l moves from the neutral position to the left, the left rear wheel 302l rolls (turns) to the left.

Also, when the right rear coupling rod 336r moves from a neutral position (position where the right rear wheel 302r is at a zero degree rolling angle) to the right during the automobile 300 moving forward, the right rear wheel 302r rolls (turns) to the right. On the other hand, when the right rear coupling rod 336r moves from the neutral position to the left, the right rear wheel 302r rolls (turns) to the left.

(Controller)

An explanation will be given of the controller 410 of the fifth embodiment.

Figure 10:
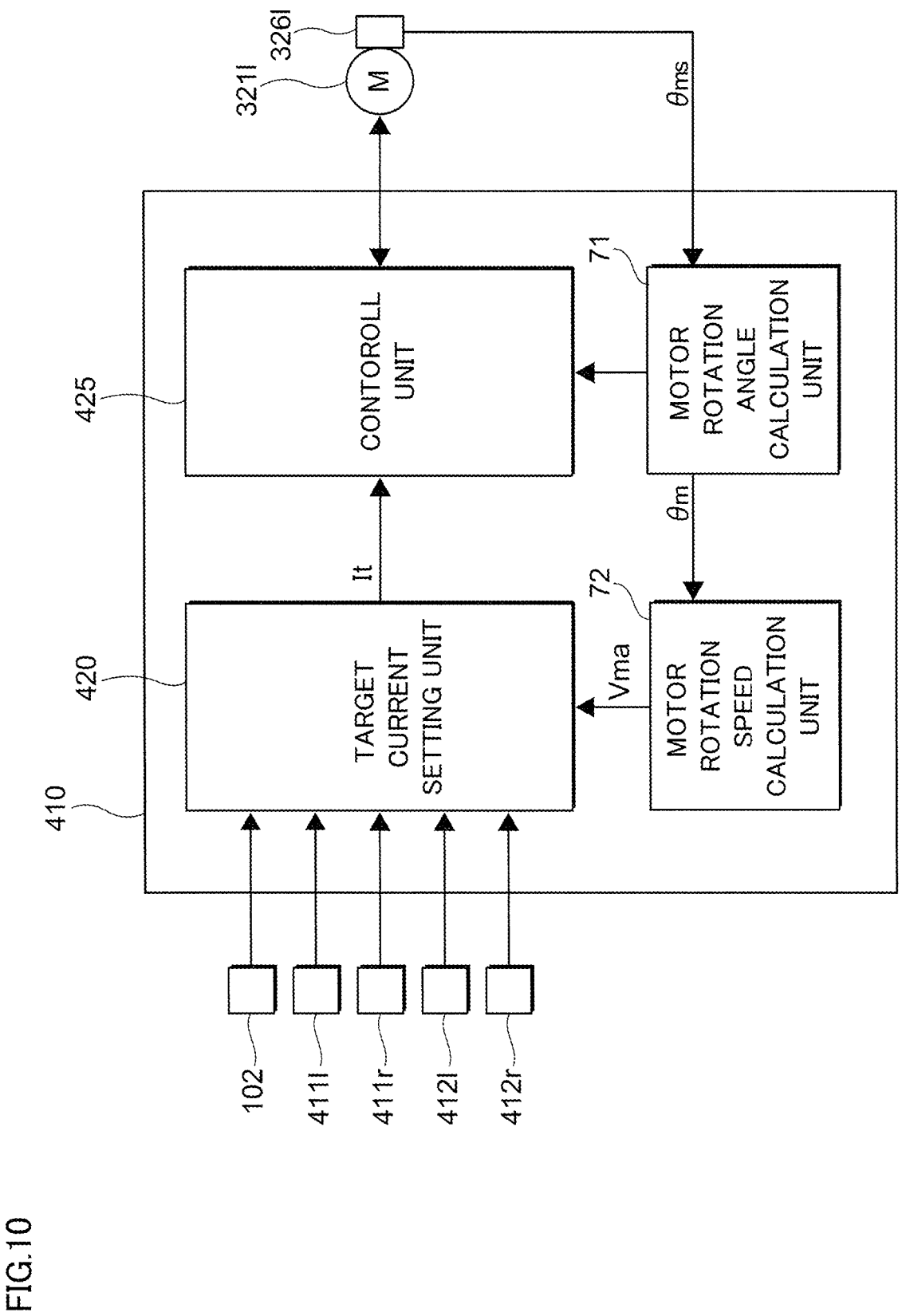
FIG. 10 shows a schematic configuration of the controller of the fifth embodiment.

FIG. 10 shows a schematic configuration of the controller 410 of the fifth embodiment.

The controller 410 receives input of signals from the above steering angle sensor 102 and the resolvers (e.g., the left front resolver 326l of the left front steering mechanism 320l). Via the CAN, the controller 410 also receives input of signals from a left front stroke sensor 411l, a right front stroke sensor 411r, a left rear stroke sensor 412l, and a right rear stroke sensor 412r detecting an expansion/contraction amount of the left front suspension device 305l, the right front suspension device 305r, the left rear suspension device 306l, and the right rear suspension device 306r, respectively.

The controller 410 includes a target current setting unit 420 and a control unit 425. The target current setting unit 420 sets the target current It to be supplied to the electric motors (e.g., the left front electric motor 321l of the left front steering mechanism 320l). The control unit 425 performs various control including a feedback control on the basis of the target current It set by the target current setting unit 420.

The target current setting unit 420 of the fifth embodiment sets the target current It individually for each of the respective electric motors (e.g., the left front electric motor 321l of the left front steering mechanism 320l) of the left front steering mechanism 320l, the right front steering mechanism 320r, the left rear steering mechanism 330l, and the right rear steering mechanism 330r. For example, the control unit 425 performs a feedback control of each electric motor on the basis of deviation between the target current It set by the target current setting unit 420 for each electric motor and the actual current Im supplied to each electric motor detected by a motor current detection unit (not shown). This is because front/rear and right/left wheels do not always have the same rolling angles in a four-wheel independent steering system like the steering device 310 of the fifth embodiment. In other respects, the control unit 425 of the fifth embodiment is the same as the control unit 30 of the first embodiment, and thus further description in this regard is omitted.

[Target Current Setting Unit]

Figure 11:
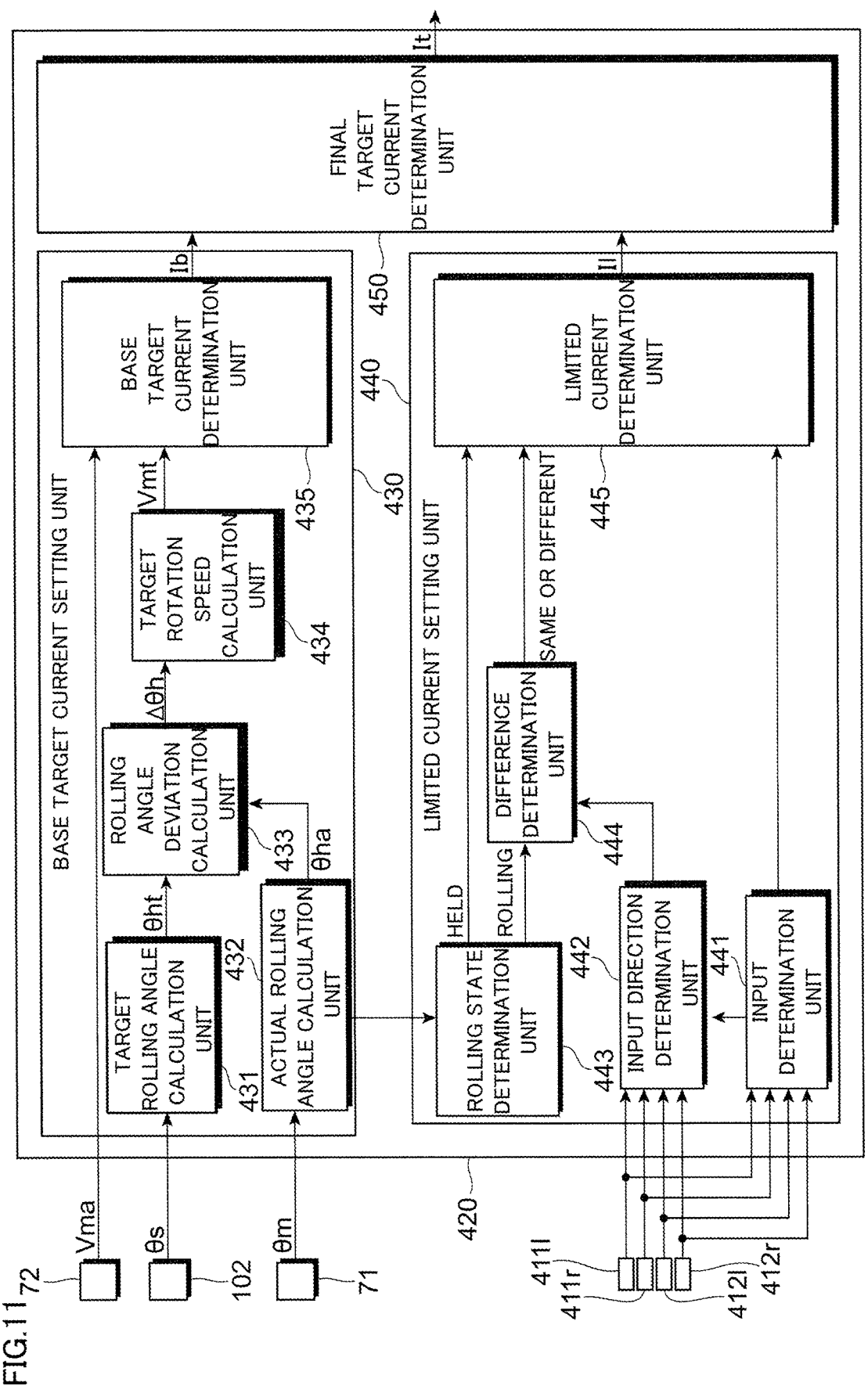
FIG. 11 shows a schematic configuration of the target current setting unit of the fifth embodiment.

FIG. 11 shows a schematic configuration of the target current setting unit 420 of the fifth embodiment.

Rolling angles of the wheels (e.g., the left front wheel 301l) need to be controlled in order that the automobile 300 can travel along a target travel line according to the driver's operation of the steering wheel 101. The controller 410 controls an actual rolling angle θha of each wheel (e.g., the left front wheel 301l) to make it equal to a target rolling angle θht, which is a target rolling angle according to the driver's steering of the steering wheel 101. When there is a large deviation between the actual rolling angle θha and the target rolling angle θht, the controller 410 sets a target rotation speed Vmt of the electric motor so as to increase the rotation speed of the electric motor (e.g., the left front electric motor 321l of the left front steering mechanism 320l). The controller 410 thereby quickly adjusts the actual rolling angle θha to the target rolling angle θht. In order that an actual rotation speed Vma of each electric motor equals the target rotation speed Vmt, the controller 410 increases the rotation speed of each electric motor with increase in deviation between the actual rotation speed Vma and the target rotation speed Vmt. To achieve this, the target current setting unit 420 increases the target current It, which is a target value of current to be supplied to each electric motor, with increase in deviation between the actual rotation speed Vma and the target rotation speed Vmt. Thus, the target current setting unit 420 sets the target current It according to the deviation between the actual rotation speed Vma and the target rotation speed Vmt of each electric motor so that the actual rotation speed Vma equals the target rotation speed Vmt.

In the following cases, however, the target current setting unit 420 sets the target current It regardless of the deviation between the actual rotation speed Vma and the target rotation speed Vmt.

The automobile 300 of the fifth embodiment also uses a steer-by-wire system. This means that any external force on the wheels to change their rolling angles is eventually transmitted to the electric motors (e.g., the left front electric motor 321l). For this reason, under application of any instantaneous external force, it is difficult to relieve the force on the transmission unit transmitting the driving force of the electric motor to the wheel.

In view of the above, the target current setting unit 420 determines whether any external excessive force greater than or equal to a predetermined force is likely to be input. And upon determination that the excessive force is likely to be input, the target current setting unit 420 reduces the target current It. For example, the predetermined force may be a value determined according to shapes and materials of the components constituting each transmission unit, including the transmission mechanism (e.g., the left front transmission mechanism 323l of the left front steering mechanism 320l) and the coupling rod (e.g., the left front coupling rod 325l of the left front steering mechanism 320l). For example, assuming that a current larger than the at-roll limited current Ilt is being supplied to the electric motor (e.g., the left front electric motor 321l), the predetermined force may be the minimum value of the force that damages any component of the transmission unit if applied to the transmission unit in a direction different from that of a force due to the driving force of the electric motor under that current. When at least any one of the components of the transmission unit, including the transmission mechanism and the coupling rod, is made of resin, the predetermined force may be set smaller than when the above components are made of metal.

More specifically, the target current setting unit 420 includes a base target current setting unit 430 and a limited current setting unit 440. The base target current setting unit 430 sets a base target current Ib as a basis for setting the target current It. The limited current setting unit 440 sets a limited current Il in response to input of a large external force. The target current setting unit 420 further includes a final target current setting unit 450 that determines the target current It finally supplied to the electric motors. The base target current setting unit 430, the limited current setting unit 440, and the final target current setting unit 450 of the fifth embodiment set the base target current Ib, set the limited current Il, and determine the target current It, respectively, for each of the electric motors provided to the left front steering mechanism 320*l*, the right front steering mechanism 320*r*, the left rear steering mechanism 330*l*, and the right rear steering mechanism 330*r* (e.g., the left front electric motor 321*l* of the left front steering mechanism 320*l*).

(Base Target Current Setting Unit)

The base target current setting unit 430 includes a target rolling angle calculation unit 431 and an actual rolling angle calculation unit 432. The target rolling angle calculation unit 431 calculates the target rolling angle θht of each wheel (e.g., the left front wheel 301*l*). The actual rolling angle calculation unit 432 calculates the actual rolling angle θha of each wheel. The base target current setting unit 430 further includes a rolling angle deviation calculation unit 433 that calculates a rolling angle deviation 40*h* as a deviation between the target rolling angle θht calculated by the target rolling angle calculation unit 431 and the actual rolling angle θha calculated by the actual rolling angle calculation unit 432. The base target current setting unit 430 further includes a target rotation speed calculation unit 434 that calculates the target rotation speed Vmt of each electric motor (e.g., the left front electric motor 321*l*) using the rolling angle deviation 40*h* calculated by the rolling angle deviation calculation unit 433. The base target current setting unit 430 further includes a base target current determination unit 435 that determines the base target current Ib using the target rotation speed Vmt calculated by the target rotation speed calculation unit 434 and the actual rotation speed Vma calculated by the motor rotation speed calculation unit 72.

Figure 12:
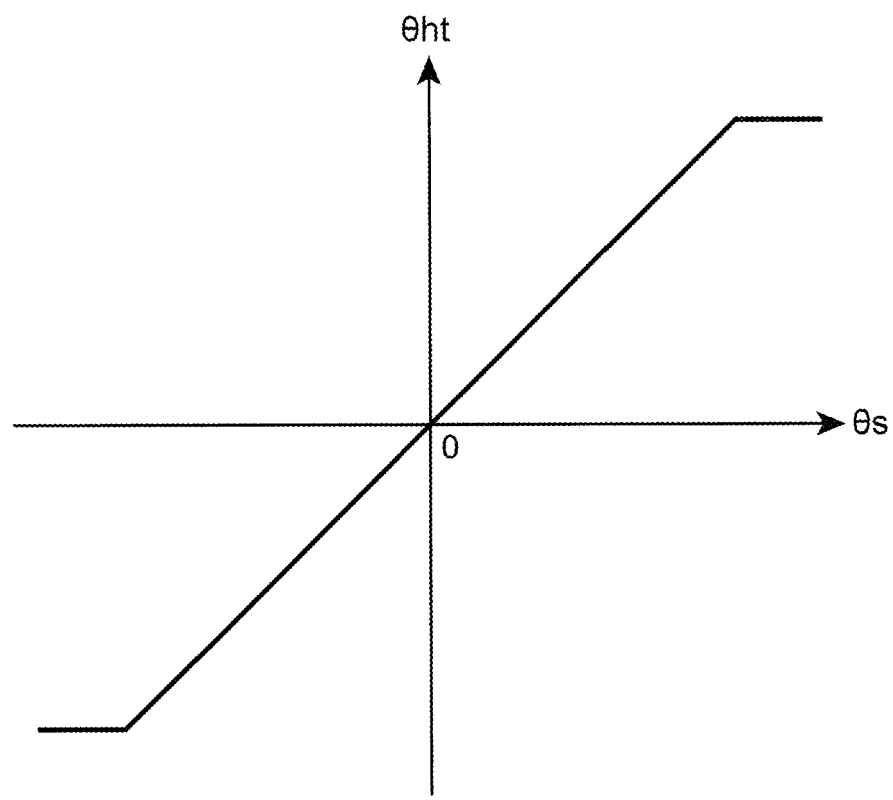
FIG. 12 shows a control map defining relationship between the steering angle and a target rolling angle.

FIG. 12 shows a control map defining relationship between the steering angle θs and the target rolling angle θht.

The target rolling angle calculation unit 431 calculates the target rolling angle θht using the steering angle θs of the steering wheel 101 detected by the steering angle sensor 102. For example, the target rolling angle calculation unit 431 calculates the target rolling angle θht according to the steering angle θs by substituting the steering angle θs into the control map as exemplarily shown in FIG. 12 or a formula defining relationship between the steering angle θs and the target rolling angle θht. The control map may be empirically created and stored in the ROM in advance, for example.

The actual rolling angle calculation unit 432 calculates the actual rolling angle θha using the motor rotation angle θm calculated by the motor rotation angle calculation unit 71. Due to mechanical connection between the electric motors (e.g., the left front electric motor 321*l*), the transmission mechanisms (e.g., the left front transmission mechanism 323*l* of the left front steering mechanism 320*l*), and the coupling rods (e.g., the left front coupling rod 325*l* of the left front steering mechanism 320*l*) and the like, there is correlation between the motor rotation angle θm of each electric motor and each coupling rod. For example, the actual rolling angle calculation unit 432 calculates the actual rolling angle θha using the integrated value of differences between a current value and a previous value of the motor rotation angle θm, which is periodically (e.g., every 1 millisecond) calculated by the motor rotation angle calculation unit 71.

The rolling angle deviation calculation unit 433 calculates the rolling angle deviation Δθh by subtracting the actual rolling angle θha calculated by the actual rolling angle calculation unit 432 from the target rolling angle θht calculated by the target rolling angle calculation unit 431 (Δθh=θht−θha).

Figure 13:
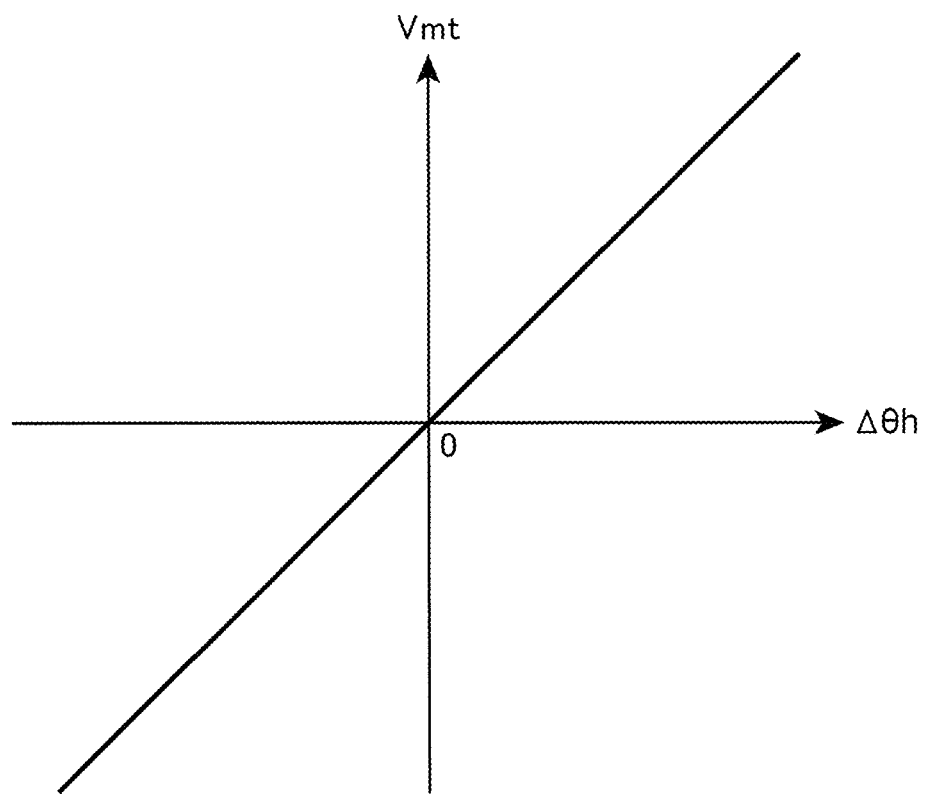
FIG. 13 shows a control map defining relationship between a rolling angle deviation and the target rotation speed.

FIG. 13 shows a control map defining relationship between the rolling angle deviation Δθh and the target rotation speed Vmt.

The target rotation speed calculation unit 434 calculates the target rotation speed Vmt according to the rolling angle deviation 40*h*. For example, the target rotation speed calculation unit 434 calculates the target rotation speed Vmt by substituting the rolling angle deviation Δθh into the control map as exemplarily shown in FIG. 13 or a formula defining relationship between the rolling angle deviation Δθh and the target rotation speed Vmt. The control map may be empirically created and stored in the ROM in advance, for example.

The base target current determination unit 435 of the fifth embodiment is the same as the base target current determination unit 215 of the first embodiment, and accordingly detailed description of the base target current determination unit 435 is omitted.

When the base target current Ib causes the electric motors (e.g., the left front electric motor 321*l*) to generate a driving force whereby the front wheels 301 are rolled to the right from their zero-rolling angle position in response to the steering wheel 101 being steered in the direction in which the steering angle θs becomes positive (i.e. in the right-turn direction), the flow direction of such a base target current Ib is defined as a positive direction. On the other hand, when the base target current Ib causes the electric motors (e.g., the left front electric motor 321*l*) to generate a driving force whereby the front wheels 301 are rolled to the left from their zero-rolling angle position in response to the steering wheel 101 being steered in the direction in which the steering angle θs becomes negative (i.e. in the left-turn direction), the flow direction of such a base target current Ib is defined as a negative direction. Also, when the base target current Ib causes the electric motors (the electric motors of the left rear steering mechanism 330*l* and the right rear steering mechanism 330*r*) to generate a driving force whereby the rear wheels 302 are rolled to the left from their zero-rolling angle position in response to the steering wheel 101 being steered in the direction in which the steering angle θs becomes positive (i.e. in the right-turn direction), the flow direction of such a base target current Ib is defined as a positive direction. On the other hand, when the base target current Ib causes the electric motors (the electric motors of the left rear steering mechanism 330*l* and the right rear steering mechanism 330*r*) to generate a driving force whereby the rear wheels 302 are rolled to the right from their zero-rolling angle position in response to the steering wheel 101 being steered in the direction in which the steering angle θs becomes negative (i.e. in the left-turn direction), the flow direction of such a base target current Ib is defined as a negative direction.

(Limited Current Setting Unit)

The limited current setting unit 440 includes an input determination unit 441 and an input direction determination unit 442. The input determination unit 441 determines whether an excessive external force, such as one from the road surface, greater than or equal to the predetermined force is likely to be input to the transmission unit. The input direction determination unit 442 determines the direction of the excessive force. The limited current setting unit 440 further includes a rolling state determination unit 443 that determines whether the wheels are in a rolling state or a held state. The limited current setting unit 440 further includes a difference determination unit 444 that determines whether the direction of the excessive force is the same as, or different from, the rolling or held direction of the wheels. The limited current setting unit 440 further includes a limited current determination unit 445 that determines the limited current Il according to the determination made by the difference determination unit 444.

The input determination unit 441 of the fifth embodiment determines whether an excessive force is likely to be input, on the basis of the expansion/contraction amount of the suspension devices (e.g., the left front suspension device 305*l*).

Assume that the automobile 300 is travelling with its suspension device being longer than a reference suspension length L0 where the rolling angle is zero and that this suspension device lengthens further due to, for example, the corresponding wheel hitting a dip in the road. In this case, the knuckle arm (e.g., the left front knuckle arm 303*l*) fixed to that wheel moves downward. This causes the drive shaft (e.g., the left front drive shaft 322*l*) coupled with the coupling rod (e.g., the left front coupling rod 325*l*) coupled with that knuckle arm to move to the wheel side. Meanwhile, assume that the automobile 300 is travelling with its suspension device being longer than the reference length L0 and that this suspension device shortens due to, for example, the corresponding wheel hitting a bump in the road. In this case, the knuckle arm (e.g., the left front knuckle arm 303*l*) fixed to that wheel moves upward. This causes, when the shortened suspension device is longer than the reference length L0, the drive shaft (e.g., the left front drive shaft 322*l*) coupled with the coupling rod (e.g., the left front coupling rod 325*l*) coupled with that knuckle arm to move to the side opposite to the wheel side.

Assume that the automobile 300 is travelling with its suspension device being shorter than the reference length L0 and that this suspension device shortens further due to, for example, the corresponding wheel hitting a bump in the road. In this case, the knuckle arm (e.g., the left front knuckle arm 303*l*) fixed to that wheel moves upward. This causes the drive shaft (e.g., the left front drive shaft 322*l*) coupled with the coupling rod (e.g., the left front coupling rod 325*l*) coupled with that knuckle arm to move to the wheel side. Meanwhile, assume that the automobile 300 is travelling with its suspension device being shorter than the reference length L0 and that this suspension device lengthens due to, for example, the corresponding wheel hitting a dip in the road. In this case, the knuckle arm (e.g., the left front knuckle arm 303*l*) fixed to that wheel moves downward. This causes, when the lengthened suspension device is shorter than the reference length L0, the drive shaft (e.g., the left front drive shaft 322*l*) coupled with the coupling rod (e.g., the left front coupling rod 325*l*) coupled with that knuckle arm to move to the side opposite to the wheel side.

In view of the above, when the absolute value of a length change rate of the suspension device (e.g., the left front suspension device 305*l*) is equal to or larger than a predetermined change rate (i.e., an extension rate or a contraction rate is equal to or larger than the predetermined change rate), the input determination unit 441 determines that an excessive force is likely to be input. When, on the other hand, the absolute value of the length change rate of the suspension device is smaller than the predetermined change rate (i.e., an extension rate or a contraction rate is smaller than the predetermined change rate), the input determination unit 441 determines that an excessive force is not likely to be input. On the basis of the length change rate of the suspension device (e.g., the left front suspension device 305*l*), the input determination unit 441 determines whether an excessive force is likely to be input to the transmission unit of the steering mechanism (e.g., the left front steering mechanism 320*l*) steering the wheel (e.g., the left front wheel 301*l*) coupled with that suspension device. This is because the external force on the wheels varies between the front/rear and right/left wheels.

The input direction determination unit 442 bases its determination on the fact that when, during the automobile 300 travelling with its suspension device (e.g., the left front suspension device 305*l*) being longer than the reference length L0, the length change rate of that suspension device is positive (i.e., in the extension direction), the drive shaft (e.g., the left front drive shaft 322*l*) moves to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the right. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the left.

The input direction determination unit 442 also bases its determination on the fact that when, during the automobile 300 travelling with its suspension device being longer than the reference length L0, the length change rate of that suspension device is negative (i.e., in the contraction direction) and its length after the contraction is longer than the reference length L0, the drive shaft moves to the side opposite to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the left. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the right.

The input direction determination unit 442 also bases its determination on the fact that when, during the automobile 300 travelling with its suspension device being shorter than the reference length L0, the length change rate of that suspension device is negative (i.e., in the contraction direction), the drive shaft moves to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the right. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the left.

The input direction determination unit 442 also bases its determination on the fact that when, during the automobile 300 travelling with its suspension device being shorter than the reference length L0, the length change rate of that suspension device is positive (i.e., in the extension direction) and its length after the extension is shorter than the reference length L0, the drive shaft moves to the side opposite to the wheel side. When this wheel is the left front wheel 301*l* or the right rear wheel 302*r*, the input direction determination unit 442 determines that a force has been input in the direction that causes the left front wheel 301l or the right rear wheel 302r to roll to the left. Meanwhile, when this wheel is the right front wheel 301r or the left rear wheel 302l, the input direction determination unit 442 determines that a force has been input in the direction that causes the right front wheel 301r or the left rear wheel 302l to roll to the right.

The rolling state determination unit 443 determines whether the wheels are rolling or being held, on the basis of the actual rolling angle θha calculated by the actual rolling angle calculation unit 432. Upon determination that the wheels are rolling, the rolling state determination unit 443 further determines whether the wheels are rolling to the right or left.

The rolling state determination unit 443 calculates a rolling angular speed Vθha of the actual rolling angle θha calculated by the actual rolling angle calculation unit 432. When the absolute value of the calculated rolling angular speed Vθha is equal to or lower than a predetermined angular speed Vθh0 (|Vθha|≤Vθh0), the rolling state determination unit 443 determines that the wheels are being held. The rolling state determination unit 443 then outputs information to that effect to the limited current determination unit 445.

When the absolute value of the calculated rolling angular speed VOha is larger than the predetermined angular speed Vθh0 (|Vθha|>Vθh0), the rolling state determination unit 443 determines that the wheels are rolling. When the sign of the rolling angular speed Vθha is positive, the rolling state determination unit 443 determines that the wheels are rolling to the right, and outputs information to that effect to the difference determination unit 444.

The predetermined angular speed Vθh0 is a value to set a dead zone. The predetermined angular speed Vθh0 may be zero.

The difference determination unit 444 and the limited current determination unit 445 of the fifth embodiment are the same as the difference determination unit 224 and the limited current determination unit 225 of the first embodiment, respectively, and thus detailed description thereof is omitted.

Also, the final target current determination unit 450 of the fifth embodiment is the same as the final target current determination unit 23 of the first embodiment, and thus detailed description thereof is omitted.

As described above, the steering device 310 of the fifth embodiment includes: the electric motors configured to apply a driving force to cause the wheels (e.g., the left front electric motor 321l of the left front steering mechanism 320l) to roll; the transmission mechanisms (e.g., the left front transmission mechanism 323l of the left front steering mechanism 320l) each as an example of the transmission unit transmitting the driving force of the electric motor to the wheel; and the coupling rods (e.g., the left front coupling rod 325l of the left front steering mechanism 320l). The steering device 310 further includes the input determination unit 441 configured to determine whether an excessive external force equal to or greater than a predetermined force is likely to be input to the transmission unit via the wheels while the electric motors are applying the driving force. The steering device 310 further includes the final target current determination unit 450 as an example of the reduction unit configured to, in response to the input determination unit 441 determining that an excessive force is likely to be input, reduce the driving force of each electric motor so that a load on the transmission unit does not exceed an upper limit that is preset according to the strength of the transmission unit.

The final target current determination unit 450 determines the target current It such that its absolute value equals the limited current Il (S712 or S713) when the following conditions are met, namely: the input determination unit 441 determines that an excessive force is likely to be input (Yes in S702); the limited current determination unit 445 determines the at-roll limited current Ilt or the at-hold limited current Ilh as the limited current Il (S706 or S708); and the absolute value of the base target current Ib is equal to or greater than the limited current Il (No in S709). To put the above another way, the final target current determination unit 450 reduces the driving force of each electric motor (e.g., the left front electric motor 321l of the left front steering mechanism 320l) so that the driving force does not exceed the upper limit value (i.e., the upper limit driving force produced by the above upper limit current) that is preset according to the strength of the transmission unit transmitting the driving force to the wheel (e.g., the left front wheel 301l).

When an excessive force is likely to be input, the above-configured steering device 310 reduces the driving force of each electric motor (e.g., the left front electric motor 321l of the left front steering mechanism 320l) so that the load on the transmission unit does not exceed the upper limit value that is preset according to the strength of the transmission unit. This can reduce the load on the transmission unit. As the load on the transmission unit can be reduced even under the input of the excessive force, there is no need to increase the size of the components of the transmission unit nor to use high strength materials for them. This can make the steering device 310 compact and lightweight.

The steering device 310 further includes the difference determination unit 444 configured to, in response to the input determination unit 441 determining that an excessive force is likely to be input, determines whether the direction of the excessive force acting on the transmission unit and the direction of the force acting on the transmission unit due to the driving force of the electric motor (e.g., the left front electric motor 321l of the left front steering mechanism 320l) are the same as or different from each other.

In response to the difference determination unit 444 determining that the above directions are different from each other, the final target current determination unit 450 reduces the driving force. Specifically, in response to the difference determination unit 444 determining that the above directions are different from each other ("Different" in S707), the limited current determination unit 445 determines the preset at-roll limited current Ilt as the limited current Il (S708). Then, when the absolute value of the base target current Ib set by the base target current setting unit 430 is equal to or greater than the limited current Il (No in S709), the final target current determination unit 450 determines the target current It such that its absolute value equals the limited current Il (the at-roll limited current Ilt) (S712 or S713). This allows to more accurately reduce the driving force of each electric motor (e.g., the left front electric motor 321l of the left front steering mechanism 320l), which can reduce the load on the transmission unit.

In response to the difference determination unit 444 determining that the above directions are the same, the final target current determination unit 450 does not reduce the driving force. Specifically, in response to the difference determination unit 444 determining that the above directions are the same ("Same" in S707), the limited current determination unit 445 determining the limited current Il to be infinite (S703). As the absolute value of the base target current Ib set by the base target current setting unit 430 is smaller than the limited current Il, the final target current determination unit 450 determines the base target current Ib as the target current It (S704).

The input determination unit 441 of the fifth embodiment makes its determination on the basis of the state of the suspension devices between the respective wheels and the vehicle body. This allows for determination using output signals from the left front stroke sensor 411*l*, the right front stroke sensor 411*r*, the left rear stroke sensor 412*l*, and the right rear stroke sensor 412*r*, which are usually provided to the automobile 300. This can reduce the cost in making the determination, as compared to using a dedicated sensor. Also, this determination using output signals from the left front stroke sensor 411*l*, the right front stroke sensor 411*r*, the left rear stroke sensor 412*l*, and the right rear stroke sensor 412*r* enables an accurate determination of whether an excessive force is likely to be input for each individual transmission unit of the steering mechanisms.

Upon determination that an excessive force is likely to be input to the transmission unit that rolls any one of the wheels (the left front wheel 301*l*, the left rear wheel 302*l*, the right front wheel 301*r*, and the right rear wheel 302*r*), the target current setting unit 420 of the fifth embodiment determines the target current It for the electric motor for rolling that wheel such that the absolute value of the target current It equals the limited current Il. At this time, the target current setting unit 420 may also determine the limited current Il as the target current It for other electric motors than the electric motor for rolling that wheel. This is because an excessive force is likely to be input at the same time to the multiple transmission units for rolling the different wheels.

Sixth Embodiment

The controller 410 of the automobile 300 of the sixth embodiment differs from that of the fifth embodiment in terms of its configuration corresponding to the input determination unit 441 and the input direction determination unit 442. The below description will focus on the difference from the fifth embodiment. The like parts in the fifth and the sixth embodiments are denoted by the same reference numerals, and detailed description thereof will be omitted.

Figure 14:
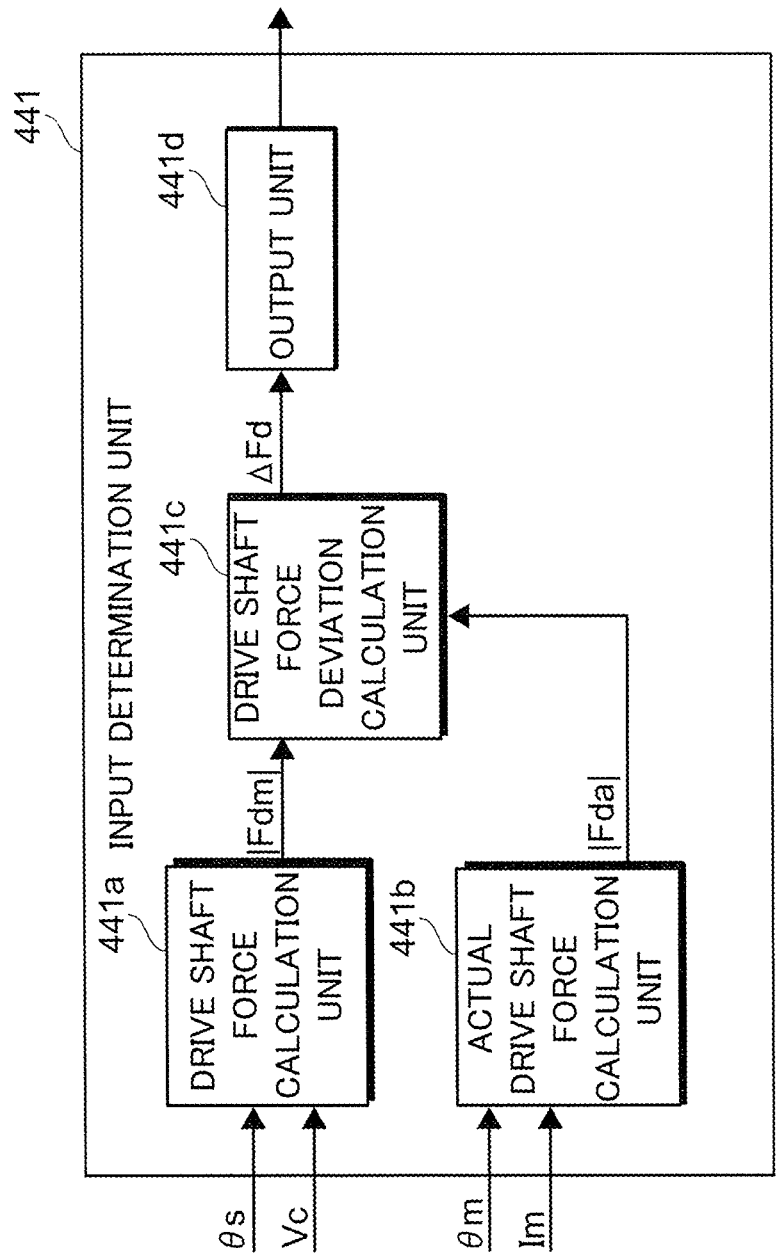
FIG. 14 shows a schematic configuration of the input determination unit of the sixth embodiment.

FIG. 14 shows a schematic configuration of the input determination unit 441 of the sixth embodiment.

The input determination unit 441 of the sixth embodiment determines whether an excessive force is likely to be input, on the basis of the absolute value of a standard drive shaft force Fdm as a standard axial force generated on the drive shaft (e.g., the left front drive shaft 322*l*) coupled with the coupling rod (e.g., the left front coupling rod 325*l*) coupled with the knuckle arm (e.g., the left front knuckle arm) and on the basis of the absolute value of an actual drive shaft force Fda as an actual axial force generated on that drive shaft. On the basis of the axial force acting on the drive shaft (e.g., the left front drive shaft 322*l*), the input determination unit 441 also determines whether an excessive force is likely to be input to the transmission unit of the steering mechanism (e.g., the left front steering mechanism 320*l*) having that drive shaft. This is to take into account the fact that an external force on the wheels varies between front/rear and right/left wheels and thus an axial force on the drive shafts (e.g., the left front drive shaft 322*l*) varies between the drive shafts.

As shown in FIG. 14, the input determination unit 441 of the sixth embodiment includes a standard drive shaft force calculation unit 441*a* calculating the absolute value |Fdm| of the standard drive shaft force Fdm, and an actual drive shaft force calculation unit 441*b* calculating the absolute value |Fda| of the actual drive shaft force Fda. The input determination unit 441 further includes a drive shaft force deviation calculation unit 441*c* calculating a drive shaft force deviation $\Delta$Fd as a deviation between the absolute value |Fdm| of the standard drive shaft force Fdm calculated by the standard drive shaft force calculation unit 441*a* and the absolute value |Fda| of the actual drive shaft force Fda calculated by the actual drive shaft force calculation unit 441*b*. The input determination unit 441 further includes an output unit 441*d* that outputs results as to whether an excessive force is likely to be input, on the basis of the drive shaft force deviation $\Delta$Fd calculated by the drive shaft force deviation calculation unit 441*c*.

The standard drive shaft force calculation unit 441*a* calculates the standard drive shaft force Fdm on the basis of the steering angle $\theta$s detected by the steering angle sensor 102 and the vehicle speed Vc, which is a moving speed of the automobile 300, detected by a vehicle speed sensor (not shown) and input to the standard drive shaft force calculation unit 441*a* via the CAN. That is, the standard drive shaft force calculation unit 441*a* calculates the standard drive shaft force Fdm according to the steering angle $\theta$s and the vehicle speed Vc. For example, the standard drive shaft force calculation unit 441*a* calculates the standard drive shaft force Fdm by substituting the steering angle $\theta$s and the vehicle speed Vc into a control map defining relationship of the steering angle $\theta$s and the vehicle speed Vc with the standard drive shaft force Fdm. The control map may be empirically created and stored in the ROM in advance, for example. The standard drive shaft force calculation unit 441*a* then calculates the absolute value |Fdm| of the standard drive shaft force Fdm.

The actual drive shaft force calculation unit 441*b* calculates the actual drive shaft force Fda on the basis of the motor rotation angle $\theta$m calculated by the motor rotation angle calculation unit 71 and the actual current Im detected by the motor current detection unit. The actual drive shaft force calculation unit 441*b* then calculates the absolute value |Fda| of the actual drive shaft force Fda.

The actual drive shaft force Fda can be assumed to be equal to the axial force given by a shaft (e.g., the left front shaft (not shown)) constituting the rack and pinion mechanism together with the drive shaft (e.g., the left front drive shaft 322*l*). Accordingly, the actual drive shaft force Fda is calculated on the basis of torque Ts applied to that shaft. The actual drive shaft force Fda is a value derived by diving the torque Ts by a pitch circle radius rs of a pinon formed on the shaft (Fda=Ts/rs).

The torque Ts is a value derived by multiplying the output shaft torque To, which is torque output from the electric motor (e.g., the left front electric motor 321*l*), by a deceleration ratio (gear ratio) N of a deceleration mechanism (e.g., a left front deceleration mechanism) (Ts=To×N).

The output shaft torque To can be calculated by substituting the motor rotation angle $\theta$m calculated by the motor rotation angle calculation unit 71 and the actual current Im detected by the motor current detection unit into a formula prestored in the ROM. Instead of the one calculated by the motor rotation angle calculation unit 71, the motor rotation angle $\theta$m may be calculated from a motor counter electromotive force using a predetermined formula.

The drive shaft force deviation calculation unit 441*c* calculates the drive shaft force deviation $\Delta$Fd by subtracting the absolute value 'Fdm' of the standard drive shaft force Fdm calculated by the standard drive shaft force calculation unit 441*a* from the absolute value 'Fda' of the actual drive shaft force Fda calculated by the actual drive shaft force calculation unit 441*b* (ΔFd=|Fda|−|Fdm|).

When the drive shaft force deviation ΔFd is larger than a predetermined value K (ΔFd>K), the output unit 441*d* determines that an excessive force is likely to be input, and outputs information to that effect to the limited current determination unit 445. When the drive shaft force deviation ΔFd is equal to or smaller than the predetermined value K (ΔFd≤K), the output unit 441*d* determines that an excessive force is not likely to be input, and outputs information to that effect to the limited current determination unit 445.

When the sign of the rolling angular speed VOha of the actual rolling angle θha calculated by the actual rolling angle calculation unit 432 is positive, the input direction determination unit 442 of the sixth embodiment determines that a force has been input in the direction that causes the front wheels 301 to roll to the right and the rear wheels 302 to roll to the left. When, on the other hand, the sign of the rolling angular speed Vθha of the actual rolling angle θha calculated by the actual rolling angle calculation unit 432 is negative, the input direction determination unit 442 determines that a force has been input in the direction that causes the front wheels 301 to roll to the left and the rear wheels 302 to roll to the right.

In this way, the input determination unit 441 and the input direction determination unit 442 of the sixth embodiment determine whether an excessive force is likely to be input to the components of the transmission unit and determine the direction of such input, on the basis of the force generated on the drive shaft (e.g., the left front drive shaft 322*l*; an example of the rack shaft), which is one of the components of the transmission unit transmitting the driving force of the electric motor (e.g., the left front electric motor 321*l* of the left front steering mechanism 320*l*) to the wheel (e.g., the left front wheel 301*l*). Thus, the input determination unit 441 and the input direction determination unit 442 can make more accurate determination. This allows to more accurately reduce the load on the transmission unit. Further, the determination is made on the basis of the force generated on the drive shaft (e.g., the left front drive shaft 322*l*), which enables an accurate determination of whether an excessive force is likely to be input for each individual transmission unit of the steering mechanism.

Seventh Embodiment

The controller 410 of the automobile 300 of the seventh embodiment differs from that of the fifth embodiment in terms of the determination method used by the input determination unit 441 and the input direction determination unit 442.

The input determination unit 441 of the seventh embodiment determines whether an excessive force has been input, on the basis of output values from a lateral G sensor (not shown) detecting acceleration of the automobile 300 in the lateral direction. The output values are fed to the input determination unit 441 via the CAN. For example, when the absolute value of the lateral acceleration detected by the lateral G sensor is equal to or larger than predetermined acceleration, the input determination unit 441 of the seventh embodiment determines that an excessive force has been input.

The input direction determination unit 442 of the seventh embodiment determines the direction of the excessive force on the basis of the output values from the lateral G sensor (not shown). For example, when the lateral acceleration detected by the lateral G sensor is to the right, the input direction determination unit 442 of the seventh embodiment determines that an excessive force has occurred in the direction that causes the front wheels 301 to roll to the right and the rear wheels 302 to roll to the left. When, on the other hand, the lateral acceleration detected by the lateral G sensor is to the left, the input direction determination unit 442 of the seventh embodiment determines that an excessive force has occurred in the direction that causes the front wheels 301 to roll to the left and the rear wheels 302 to roll to the right.

In this way, the input determination unit 441 and the input direction determination unit 442 of the seventh embodiment makes determination using the detected values of the lateral G sensor, which is usually provided to the automobile 300. This can reduce the cost in making the determination, as compared to using a dedicated sensor.

Eighth Embodiment

The controller 410 of the automobile 300 of the eighth embodiment differs from that of the fifth embodiment in terms of the determination method used by the input determination unit 441 and the input direction determination unit 442.

The input determination unit 441 of the eighth embodiment determines whether an excessive force has been input, on the basis of pressure signals from a pressure sensor (not shown) detecting pressure on the wheels (hereinafter may be referred to as a "tire pressure"). The pressure signals are fed to the input determination unit 441 via the CAN.

Assume that the automobile 300 is travelling under a tire pressure smaller than a reference tire pressure at which the rolling angle is zero, and that the tire pressure reduces due to, for example, the corresponding wheel hitting a dip in the road. In this case, the knuckle arm (e.g., the left front knuckle arm 303*l*) fixed to that wheel moves downward. This causes the drive shaft (e.g., the left front drive shaft 322*l*) coupled with the coupling rod (e.g., the left front coupling rod 325*l*) coupled with that knuckle arm to move to the wheel side. Meanwhile, assume that the automobile 300 is travelling under a tire pressure smaller than the reference tire pressure and that the tire pressure increases due to, for example, the corresponding wheel hitting a bump in the road. In this case, the knuckle arm (e.g., the left front knuckle arm 303*l*) fixed to that wheel moves upward. This causes, when the increased tire pressure is smaller than the reference tire pressure, the drive shaft (e.g., the left front drive shaft 322*l*) coupled with the coupling rod (e.g., the left front coupling rod 325*l*) coupled with that knuckle arm to move to the side opposite to the wheel side.

Assume that the automobile 300 is travelling under a tire pressure larger than the reference tire pressure and that the tire pressure increases due to, for example, the corresponding wheel hitting a bump in the road. In this case, the knuckle arm (e.g., the left front knuckle arm 303*l*) fixed to that wheel moves upward. This causes the drive shaft (e.g., the left front drive shaft 322*l*) coupled with the coupling rod (e.g., the left front coupling rod 325*l*) coupled with that knuckle arm to move to the wheel side. Meanwhile, assume that the automobile 300 is travelling under a tire pressure larger than the reference tire pressure and that the tire pressure reduces due to, for example, the corresponding wheel hitting a dip in the road. In this case, the knuckle arm (e.g., the left front knuckle arm 303*l*) fixed to that wheel moves downward. This causes, when the reduced tire pressure is larger than the reference tire pressure, the drive shaft (e.g., the left front drive shaft 322*l*) coupled with the coupling rod (e.g., the left front coupling rod 325*l*) coupled with that knuckle arm to move to the side opposite to the wheel side.

In view of the above, when the absolute value of a tire pressure change rate is equal to or larger than a predetermined pressure change rate, the input determination unit 441 of the eighth embodiment determines that an excessive force is likely to be input. When, on the other hand, the absolute value of the tire pressure change rate is smaller than the predetermined pressure change rate, the input determination unit 441 determines that an excessive force is not likely to be input.

The input direction determination unit 442 of the eighth embodiment bases its determination on the fact that when, during the automobile 300 travelling under a tire pressure smaller than the reference tire pressure, the tire pressure change rate is on the decrease, the drive shaft (e.g., the left front drive shaft 322*l*) moves to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the right. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the left.

The input direction determination unit 442 also bases its determination on the fact that when, during the automobile 300 travelling under a tire pressure smaller than the reference tire pressure, the tire pressure change rate is on the increase and the tire pressure after the increase is smaller than the reference tire pressure, the drive shaft moves to the side opposite to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the left. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the right.

The input direction determination unit 442 also bases its determination on the fact that when, during the automobile 300 travelling under a tire pressure larger than the reference tire pressure, the tire pressure change rate is on the increase, the drive shaft moves to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the right. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the left.

The input direction determination unit 442 also bases its determination on the fact that when, during the automobile 300 travelling under a tire pressure larger than the reference tire pressure, the tire pressure change rate is on the decrease and the tire pressure after the decrease is larger than the reference tire pressure, the drive shaft moves to the side opposite to the wheel side. When this wheel is the left front wheel 301*l* or the right rear wheel 302*r*, the input direction determination unit 442 determines that a force has been input in the direction that causes the left front wheel 301*l* or the right rear wheel 302*r* to roll to the left. Meanwhile, when this wheel is the right front wheel 301*r* or the left rear wheel 302*l*, the input direction determination unit 442 determines that a force has been input in the direction that causes the right front wheel 301*r* or the left rear wheel 302*l* to roll to the right.

In this way, the input determination unit 441 and the input direction determination unit 442 of the eighth embodiment makes determination using detection values of the pressure sensor, which is usually provided to the automobile 300. This can reduce the cost in making the determination, as compared to using a dedicated sensor.

The elements of the controllers 10, 410 in the above embodiments may be implemented by either hardware or software. When some or all of the elements of the present invention are implemented by software, that software (computer programs) may be provided in the form of a computer-readable storage medium. Examples of the computer-readable storage medium include, but not limited to, portable storage media such as flexible disks and CD-ROMs, internal storage devices inside the computer such as RAMs and ROMs, and external storage devices such as hard disk drives.

REFERENCE SIGNS LIST 1, 300 Automobile
10, 410 Controller
20, 420 Target current setting unit
21, 430 Base target current setting unit
22, 440 Limited current setting unit
23, 450 Final target current setting unit
221, 441 Input determination unit
222, 442 Input direction determination unit
223, 443 Rolling state determination unit
224, 444 Difference determination unit
225, 445 Limited current determination unit

The invention claimed is:

1. A steering device comprising:
   an electric motor configured to apply a rotary force to rotate a wheel of a vehicle;
   a transmission configured to transmit the rotary force of the electric motor to the wheel; and
   a CPU, wherein
   the CPU is configured to determine whether an excessive external force equal to or greater than a predetermined force is input, or likely to be input, to the transmission via the wheel while the electric motor is applying the rotary force,
   the CPU is configured to, in response to the CPU determining that the excessive external force is input, or likely to be input, to the transmission, reduce the driving force of the electric motor so that a load on the transmission does not exceed an upper limit that is preset according to strength of the transmission,
   the CPU is configured to, in response to the CPU determining that the excessive external force is input, or likely to be input, to the transmission, determine whether a direction of a force acting on the transmission due to the excessive external force and a direction of a force acting on the transmission due to the rotary force of the electric motor are the same as or different from each other, and
   the CPU is configured to reduce the rotary force when the directions are determined by the CPU to be different from each other.

2. A steering device comprising:
an electric motor configured to apply a rotary force to cause a wheel of a vehicle to roll;
a transmission configured to transmit the rotary force of the electric motor to the wheel; and
a CPU, wherein
the CPU is configured to determine whether an excessive external force equal to or greater than a predetermined force is input, or likely to be input, to the transmission via the wheel while the electric motor is applying the rotary force,
the CPU is configured to, in response to the CPU determining that the excessive external force is input, or likely to be input, to the transmission, reduce the rotary force of the electric motor so that a load on the transmission does not exceed an upper limit that is preset according to strength of the transmission,
the CPU is configured to, in response to the CPU determining that the excessive external force is input, or likely to be input, to the transmission, determine whether a direction of a force acting on the transmission due to the excessive external force and a direction of a force acting on the transmission due to the rotary force of the electric motor are the same as or different from each other, and
the CPU is configured not to reduce the rotary force when the directions are determined by the CPU to be the same as each other.

3. The steering device according to claim 1, wherein the CPU is configured to make determination on a basis of a state of a suspension provided between the wheel and a vehicle body.

4. The steering device according to claim 1, wherein the CPU is configured to make determination on a basis of a force generated on a rack shaft configured to make the wheel roll under the rotary force of the electric motor.

5. The steering device according to claim 1, wherein the CPU is configured to make determination on a basis of a lateral acceleration of the vehicle.

6. The steering device according to claim 1, wherein the CPU is configured to make determination on a basis of pressure on the wheel.

7. The steering device according to claim 2, wherein the CPU is configured to make determination on a basis of a state of a suspension provided between the wheel and a vehicle body.

8. The steering device according to claim 2, wherein the CPU is configured to make determination on a basis of a force generated on a rack shaft configured to make the wheel roll under the rotary force of the electric motor.

9. The steering device according to claim 2, wherein the CPU is configured to make determination on a basis of a lateral acceleration of the vehicle.

10. The steering device according to claim 2, wherein the CPU is configured to make determination on a basis of pressure on the wheel.

11. The steering device according to claim 2, wherein the transmission is composed of a worm wheel and a worm.

12. The steering device according to claim 1, wherein
the electric motor is configured to apply the rotary force to rotate the wheel in one direction, and
the excessive external force causes the electric motor to rotate in other direction.

* * * * *